US011285611B2

(12) United States Patent
Park et al.

(10) Patent No.: US 11,285,611 B2
(45) Date of Patent: Mar. 29, 2022

(54) ROBOT AND METHOD OF CONTROLLING THEREOF

(71) Applicant: LG ELECTRONICS INC., Seoul (KR)

(72) Inventors: Yongjin Park, Seoul (KR); Minook Kim, Seoul (KR); Jungkwan Son, Seoul (KR); Tacksung Choi, Seoul (KR); Sewan Gu, Seoul (KR); Jinho Sohn, Seoul (KR); Taegil Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 266 days.

(21) Appl. No.: 16/420,852

(22) Filed: May 23, 2019

(65) Prior Publication Data

US 2020/0122333 A1  Apr. 23, 2020

(30) Foreign Application Priority Data

Oct. 18, 2018  (KR) .................. 10-2018-0124634

(51) Int. Cl.
*B25J 9/16* (2006.01)
*B25J 13/00* (2006.01)
*B25J 13/08* (2006.01)
*B25J 19/02* (2006.01)

(52) U.S. Cl.
CPC ........... *B25J 9/1697* (2013.01); *B25J 13/003* (2013.01); *B25J 13/086* (2013.01); *B25J 19/023* (2013.01); *B25J 9/1676* (2013.01)

(58) Field of Classification Search
USPC .................................................. 700/245–264
See application file for complete search history.

(56) References Cited

U.S. PATENT DOCUMENTS

| 4,398,720 A | * | 8/1983 | Jones ................. A63F 3/00643 273/238 |
| 4,729,563 A | * | 3/1988 | Yokoi ..................... A63F 13/04 463/31 |
| 4,815,733 A | * | 3/1989 | Yokoi ..................... A63F 13/04 463/31 |

(Continued)

FOREIGN PATENT DOCUMENTS

| CN | 107450729 | 12/2017 |
| EP | 3 338 963 | 6/2018 |

(Continued)

OTHER PUBLICATIONS

Korean Office Action dated Feb. 13, 2020 issued in KR Application No. 10-2018-0124634.

(Continued)

*Primary Examiner* — Jonathan L Sample
(74) *Attorney, Agent, or Firm* — Ked & Associates, LLP

(57) ABSTRACT

A robot includes a sensing unit including at least one sensor for detecting a user, a face detector configured to acquire an image including a face of the user detected by the sensing unit, a controller configured to detect an interaction intention of the user from the acquired image, and an output unit including at least one of a speaker or a display for outputting at least one of sound or a screen for inducing interaction of the user, when the interaction intention is detected.

20 Claims, 13 Drawing Sheets

(56) References Cited

U.S. PATENT DOCUMENTS

| | | | | |
|---|---|---|---|---|
| 6,452,348 B1* | 9/2002 | Toyoda | B25J 13/003 | 318/3 |
| 6,519,506 B2* | 2/2003 | Osawa | A63H 3/28 | 318/565 |
| 6,560,512 B1* | 5/2003 | Rosen | B25J 9/1664 | 700/245 |
| 6,580,369 B1* | 6/2003 | Eberhardt | G06K 7/0008 | 257/E21.503 |
| 6,615,109 B1* | 9/2003 | Matsuoka | G06K 17/00 | 700/223 |
| 6,714,840 B2* | 3/2004 | Sakaue | B25J 9/1694 | 318/568.1 |
| 6,832,132 B2* | 12/2004 | Ishida | B62D 57/032 | 180/8.1 |
| 6,853,880 B2* | 2/2005 | Sakagami | G06N 3/008 | 318/568.2 |
| 6,895,305 B2* | 5/2005 | Lathan | G06F 3/011 | 700/245 |
| 6,967,455 B2* | 11/2005 | Nakadai | B25J 13/00 | 318/567 |
| 6,980,956 B1* | 12/2005 | Takagi | G06N 3/004 | 700/250 |
| 7,065,490 B1* | 6/2006 | Asano | G10L 13/033 | 318/568.12 |
| 7,136,722 B2* | 11/2006 | Nakamura | B25J 9/1633 | 700/245 |
| 7,164,969 B2* | 1/2007 | Wang | B25J 9/0003 | 700/245 |
| 7,313,524 B1* | 12/2007 | Minamino | | 704/270 |
| 8,195,353 B2* | 6/2012 | Ichinose | G01C 22/006 | 701/26 |
| 8,484,146 B2* | 7/2013 | Movellan | B25J 13/003 | 706/45 |
| 8,594,845 B1* | 11/2013 | Gharpure | G10L 15/22 | 700/253 |
| 8,676,581 B2* | 3/2014 | Flaks | G10L 15/24 | 704/240 |
| 8,812,171 B2* | 8/2014 | Filev | G06T 13/205 | 701/1 |
| 8,918,208 B1* | 12/2014 | Hickman | B25J 9/1602 | 700/253 |
| 8,942,849 B2* | 1/2015 | Maisonnier | G05B 15/00 | 700/250 |
| 9,174,342 B2* | 11/2015 | Pinter | B25J 9/1676 | |
| 9,302,393 B1* | 4/2016 | Rosen | G06N 3/008 | |
| 9,950,421 B2* | 4/2018 | Monceaux | B25J 9/0006 | |
| 10,438,587 B1* | 10/2019 | Lam | G10L 15/22 | |
| 10,706,841 B2* | 7/2020 | Gruber | G10L 13/02 | |
| 10,836,041 B2* | 11/2020 | Ichikawa | G06K 9/00664 | |
| 10,880,470 B2* | 12/2020 | Buibas | H04N 5/23222 | |
| 10,898,999 B1* | 1/2021 | Cohen | B25J 9/0003 | |
| 10,904,611 B2* | 1/2021 | Van Os | G10L 17/22 | |
| 2002/0061504 A1* | 5/2002 | Saijo | G06N 3/008 | 434/268 |
| 2002/0081937 A1* | 6/2002 | Yamada | A63H 3/48 | 446/175 |
| 2002/0120362 A1* | 8/2002 | Lathan | B25J 13/08 | 700/245 |
| 2003/0045203 A1* | 3/2003 | Sabe | G06N 3/008 | 446/356 |
| 2003/0220796 A1* | 11/2003 | Aoyama | G10L 15/22 | 704/275 |
| 2004/0006483 A1* | 1/2004 | Sasaki | G10L 15/22 | 704/277 |
| 2004/0013295 A1* | 1/2004 | Sabe | G06T 7/97 | 382/153 |
| 2004/0039483 A1* | 2/2004 | Kemp | G05B 13/0265 | 700/245 |
| 2004/0104702 A1* | 6/2004 | Nakadai | G06T 1/0014 | 318/568.12 |
| 2004/0190754 A1* | 9/2004 | Sakagami | H04N 7/18 | 382/103 |
| 2005/0038647 A1* | 2/2005 | Baker | G10L 15/065 | 704/231 |
| 2005/0197739 A1* | 9/2005 | Noda | B25J 11/001 | 700/245 |
| 2005/0216121 A1* | 9/2005 | Sawada | G06N 3/008 | 700/245 |
| 2005/0222713 A1* | 10/2005 | Kawabe | B25J 19/021 | 700/259 |
| 2005/0240412 A1* | 10/2005 | Fujita | G10L 15/16 | 704/270 |
| 2005/0267826 A1* | 12/2005 | Levy | H04N 7/141 | 705/34 |
| 2006/0122837 A1* | 6/2006 | Kim | G10L 15/22 | 704/270.1 |
| 2006/0126918 A1* | 6/2006 | Oohashi | G05D 1/0251 | 382/153 |
| 2006/0136210 A1* | 6/2006 | Menendez-Pidal | G10L 15/144 | 704/256.8 |
| 2006/0143017 A1* | 6/2006 | Sonoura | G10L 15/26 | 704/275 |
| 2006/0257830 A1* | 11/2006 | Lin | G09B 5/04 | 434/167 |
| 2006/0287850 A1* | 12/2006 | Morikawa | G10L 15/22 | 704/200 |
| 2007/0150106 A1* | 6/2007 | Hashimoto | G06N 3/004 | 700/245 |
| 2007/0192910 A1* | 8/2007 | Vu | B25J 19/06 | 700/245 |
| 2007/0198128 A1* | 8/2007 | Ziegler | B25J 19/06 | 700/245 |
| 2008/0021597 A1* | 1/2008 | Merte | F16P 3/147 | 700/255 |
| 2008/0256008 A1* | 10/2008 | Kwok | G06N 3/004 | 706/20 |
| 2008/0281766 A1* | 11/2008 | Kwok | G06N 3/004 | 706/12 |
| 2009/0030552 A1* | 1/2009 | Nakadai | G10L 21/028 | 700/258 |
| 2009/0099849 A1* | 4/2009 | Iwasawa | G10L 25/60 | 704/275 |
| 2009/0162824 A1* | 6/2009 | Heck | G06N 3/004 | 434/322 |
| 2009/0173561 A1 | 7/2009 | Moriguchi et al. | | |
| 2009/0187278 A1* | 7/2009 | Zhuk | G05D 1/0291 | 700/246 |
| 2009/0210227 A1* | 8/2009 | Sugiyama | G10L 15/22 | 704/246 |
| 2009/0252423 A1* | 10/2009 | Zhu | G06K 9/00201 | 382/209 |
| 2009/0313019 A1* | 12/2009 | Kato | G10L 17/26 | 704/254 |
| 2009/0319267 A1* | 12/2009 | Kurki-Suonio | G10L 15/30 | 704/235 |
| 2010/0185328 A1* | 7/2010 | Kim | B25J 9/104 | 700/259 |
| 2010/0250241 A1* | 9/2010 | Iwahashi | G10L 15/22 | 704/10 |
| 2010/0329479 A1* | 12/2010 | Nakadai | B25J 9/00 | 381/92 |
| 2011/0224978 A1* | 9/2011 | Sawada | G10L 15/32 | 704/231 |
| 2011/0231016 A1* | 9/2011 | Goulding | G01C 21/20 | 700/246 |
| 2012/0185090 A1* | 7/2012 | Sanchez | G06N 3/008 | 700/253 |
| 2012/0264095 A1* | 10/2012 | Yu | G10L 15/24 | 434/236 |
| 2013/0035790 A1* | 2/2013 | Olivier, III | G06K 9/00228 | 700/246 |
| 2013/0103196 A1* | 4/2013 | Monceaux | A63F 9/183 | 700/253 |
| 2013/0226344 A1* | 8/2013 | Wong | G05D 1/0242 | 700/258 |
| 2014/0067121 A1* | 3/2014 | Brooks | B25J 9/1676 | 700/255 |

(56) References Cited

U.S. PATENT DOCUMENTS

| | | | |
|---|---|---|---|
| 2015/0217449 A1* | 8/2015 | Meier | G05B 13/027 |
| | | | 700/257 |
| 2015/0279350 A1* | 10/2015 | Onishi | G06F 40/40 |
| | | | 704/201 |
| 2015/0310849 A1* | 10/2015 | Onishi | G10L 13/027 |
| | | | 704/258 |
| 2015/0314454 A1* | 11/2015 | Breazeal | B25J 11/001 |
| | | | 700/259 |
| 2016/0136817 A1* | 5/2016 | Fouillade | B25J 11/0005 |
| | | | 700/246 |
| 2017/0113353 A1* | 4/2017 | Monceaux | G10L 15/26 |
| 2017/0120446 A1* | 5/2017 | Veltrop | B25J 9/1661 |
| 2017/0125008 A1* | 5/2017 | Maisonnier | G06N 3/008 |
| 2017/0173791 A1* | 6/2017 | Dalibard | B25J 9/1697 |
| 2017/0206064 A1* | 7/2017 | Breazeal | G06F 8/36 |
| 2017/0225321 A1* | 8/2017 | Deyle | B25J 9/1679 |
| 2017/0266812 A1* | 9/2017 | Thapliya | B25J 11/0005 |
| 2017/0357256 A1* | 12/2017 | Mizutani | G05D 1/0297 |
| 2018/0009118 A1* | 1/2018 | Yamaga | B25J 11/0005 |
| 2018/0018520 A1* | 1/2018 | Sumiyoshi | G10L 17/00 |
| 2018/0114125 A1* | 4/2018 | Ichiboshi | A61B 5/1113 |
| 2018/0178377 A1 | 6/2018 | Yang et al. | |
| 2019/0042188 A1 | 2/2019 | Kirihara | |
| 2019/0130904 A1* | 5/2019 | Homma | G06N 3/0445 |
| 2019/0146518 A1* | 5/2019 | Deng | G05D 1/0255 |
| | | | 382/118 |
| 2019/0198006 A1* | 6/2019 | Guo | G10L 15/22 |
| 2019/0198007 A1* | 6/2019 | Guo | B25J 9/0003 |
| 2019/0198008 A1* | 6/2019 | Guo | G06F 3/165 |
| 2019/0202060 A1* | 7/2019 | Aaron | G10L 15/22 |
| 2019/0311540 A1* | 10/2019 | Kovacevitch | G06K 9/00362 |
| 2019/0351558 A1 | 11/2019 | Park | |
| 2019/0354246 A1 | 11/2019 | Park | |
| 2020/0298394 A1* | 9/2020 | Han | B25J 13/087 |
| 2020/0341480 A1* | 10/2020 | Jung | G05D 1/0223 |

FOREIGN PATENT DOCUMENTS

| | | |
|---|---|---|
| KR | 10-2009-0005238 | 1/2009 |
| KR | 10-2009-0064814 | 6/2009 |
| KR | 10-2013-0093290 | 8/2013 |
| KR | 10-2018-0074403 | 7/2018 |
| KR | 10-2018-0080498 | 7/2018 |
| KR | 10-2018-0113503 | 10/2018 |

OTHER PUBLICATIONS

European Search Report dated Feb. 25, 2020 issued in EP Application No. 19188093.9.

* cited by examiner

ROBOT AND METHOD OF CONTROLLING THEREOF

CROSS-REFERENCE TO RELATED APPLICATION

This application claims priority under 35 U.S.C. § 119 to Korean Application No. 10-2018-0124634 filed on Oct. 18, 2018, whose entire disclosure is hereby incorporated by reference.

BACKGROUND

1. Field

The present disclosure relates to a robot and, more particularly, to a robot capable of recognizing a user having an intention to interact with the robot and performing interaction with the recognized user.

2. Background

Robots may have applications in various fields, such as industry, space and ocean exploration, and medicine. For example, robots may perform repetitive tasks in manufacturing, such as automobile production. Furthermore, robots may be adapted to perform various services, which may vary according to the locations of the robot, the users at the locations, the situation, time, etc. For example, robots may perform various functions in airports, hotels, hospitals, schools, large shopping facilities, cultural facilities, or public facilities. For example, a robot may include a camera to capture images, and the robot may display the captured images or data generated based on processing the captured images.

To initiate an action by a robot, a user may typically provide an input through a touchscreen, a button, or other input device, and/or the user may voice an audio input, such as selected startup word or phrase, that is detected by the robot. The robot may then perform the action, such as to interact with the user, based on receiving the input. However, when a robot initiates actions based on a receiving a user input through an input device, the user needs to be positioned sufficiently close to the robot to use the input device, which may be difficult with the when the robot is moving or when the robot is positioned in a crowded location in which access to the robot may be blocked by other users. Similarly, when a robot initiates actions based on a receiving an audio input, the robot may not be able to accurately recognize the audio input of the user in a crowded location due to high levels of ambient noises. Furthermore, the robot may not accurately identify the user who has voiced the audio input among the multiple users located in the crowded location.

BRIEF DESCRIPTION OF THE DRAWINGS

The embodiments will be described in detail with reference to the following drawings in which like reference numerals refer to like elements wherein.

DETAILED DESCRIPTION

Hereinafter, embodiments disclosed in this specification will be described in detail with reference to the accompanying drawings. The accompanying drawings are shown merely for ease of understanding embodiments disclosed in this specification, and it should be understood that they are not intended to limit the technical idea disclosed in this specification, and include all alterations, equivalents and substitutions included in the scope and spirit of the present disclosure.

In the following discussion, a robot according to embodiments of the present disclosure may be implemented as a guidance robot for providing a variety of information such as route guidance, product guidance, and flight information to a user who uses the robot in airports or department stores. However, the present disclosure is limited thereto and various types of robots capable of different types of service and interactions may be implemented.

Figure 1:
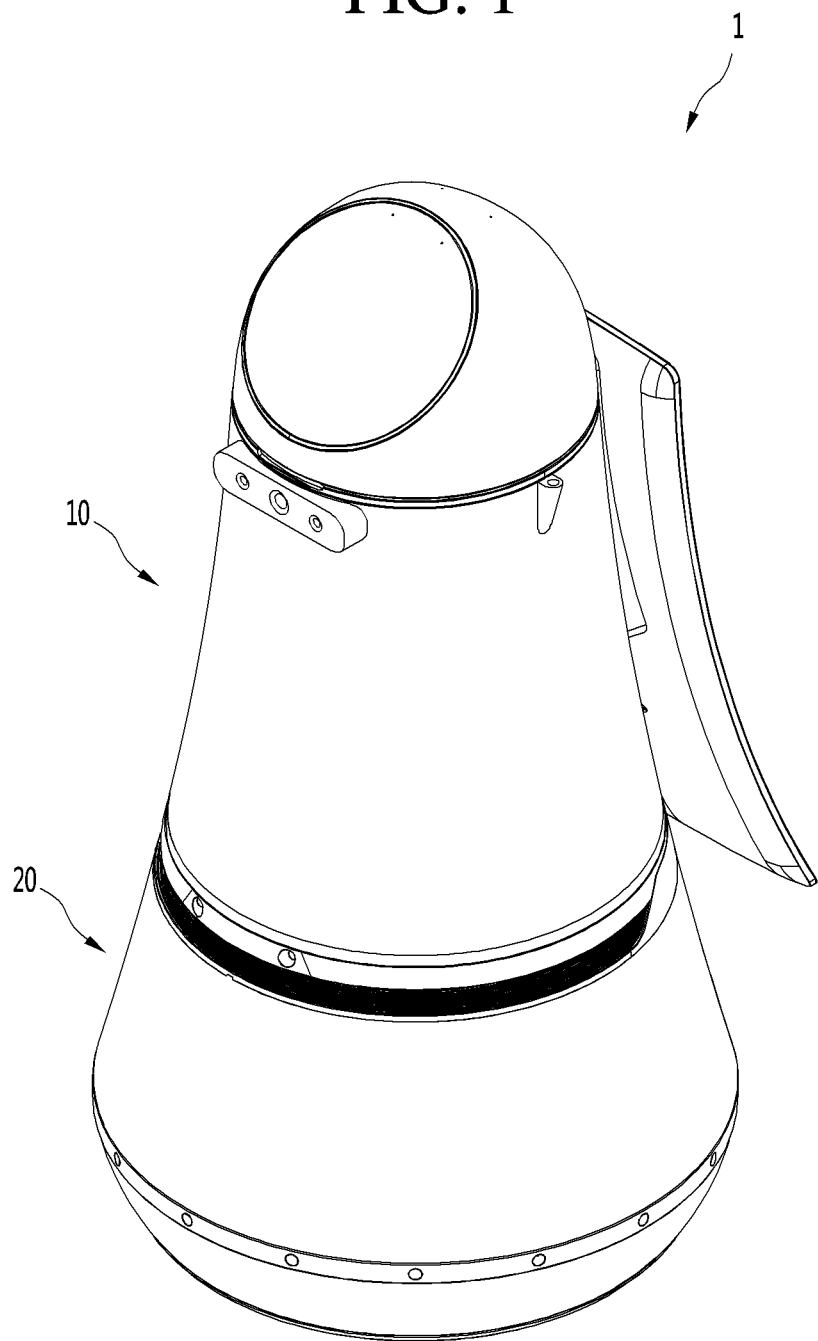
FIG. 1 is a perspective view showing the appearance of a robot according to an embodiment of the present disclosure.
Figure 2:
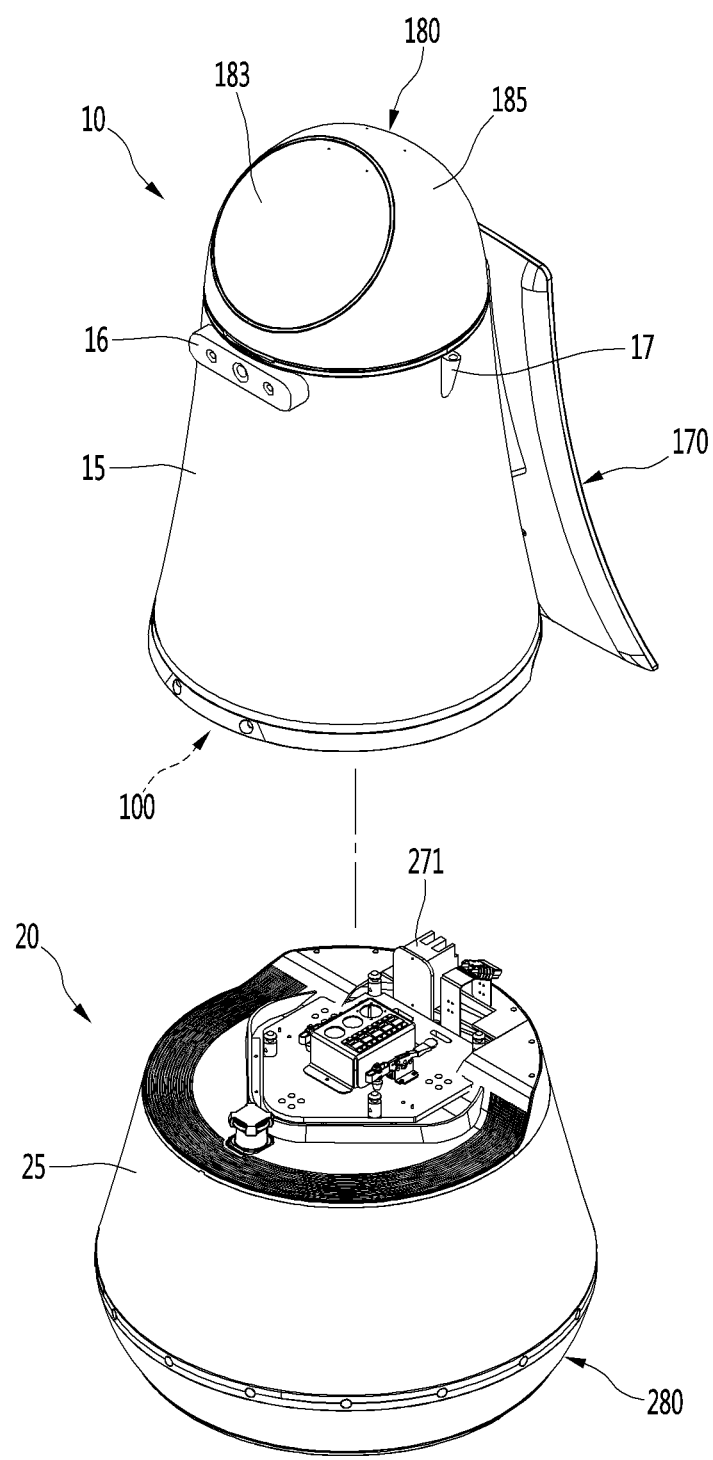
FIG. 2 is a view showing a state in which an upper module and a lower module of FIG. 1 are separated.

FIG. 1 is a perspective view showing the appearance of a robot 1 according to an embodiment of the present disclosure, and FIG. 2 is a view showing a state in which an upper module 10 and a lower module 20 of robot 1 in FIG. 1 are separated. Referring to FIGS. 1 and 2, the robot 1 according to the embodiment of the present disclosure may include an upper module 10 and a lower module 20. In addition, the upper module 10 and the lower module 20 may be provided to be attached to or detached from each other. In the robot 1 according to an embodiment of the present disclosure, the upper module 10 may include components (described below) to provide a user interface (UI) that varies according to the service environment. In addition, the lower module 20 may include components (describe below) to provide a traveling function for movement.

The upper module 10 may include a body 100, a head 180 and a display 170. The body 100 may include an upper case 15 forming appearance thereof, and a first camera 16 and a second camera 17 each provided on one side of the upper case 15.

The upper case 15 may have a cylindrical shape with a diameter increasing downward. It should be appreciated, however, that the shape is provided merely an example, and upper case 15 may have other shapes or configurations that may vary, for example, based on the locations and services to be performed. The first camera 16 may be provided on a front surface of the upper case 15 to face forward. A plurality of second cameras 17 may be provided on the side surface of the upper case 15.

The first camera 16 may include a three-dimension (3D) stereo camera. The 3D stereo camera may perform functions such as obstacle detection, user face recognition, stereoscopic image acquisition, etc. The robot 1 may detect and avoid an obstacle according to a movement direction thereof, confirm a current position, recognize a user to perform various control operations, etc. based on images captured by the first camera 16.

The second camera 17 may include a simultaneous localization and mapping (SLAM) camera. The SLAM camera serve to track the current position of the camera through feature point matching and to create a three-dimensional map based on the current position. For example, the robot 1 may check the current position thereof based on images captured by the second camera 17.

The body 100 may further include a red, green, blue, distance (RGBD) sensor (not shown) and/or a speaker (not shown) provided on one side of the upper case 15. The RGBD sensor may perform a function for detecting collision with an obstacle while the robot 1 travels. To this end, the RGBD sensor may be located on the front side of the robot 1, e.g., adjacent to the first camera 16. The speaker may perform a function for audibly outputting airport related information to the user. For example, the speaker may be formed on an outer circumferential surface of the upper case 15.

The display 170 may be located in one direction of the body 100. For example, the display 170 may be provided on the rear side of the robot 1 to output visual content to a following user. In addition, the display 170 may include a curved display extending in an upper-and-lower direction to improve visibility of a lower region of the display relative to the following user. The display may display a screen for providing visual information. Referring to FIG. 1, a direction in which the first camera 16 is installed may be defined as a "front" side, and a direction in which the display 170 is installed may be defined as a "rear" side, based on a center axis of the robot 1.

The display 170 may be coupled to a movement guidance unit 140 of the body 100. Based on guidance data received from the movement guidance unit 140, the display 170 may open or shield the inside of the body 100. In another example, the display 170 may be coupled and fixed to the body 100 using a physical fixing member, such as a screw or bolt.

The display 170 may be provided such that the robot 1 provides a guidance function to the user. Accordingly, the display 170 may be located in a direction opposite to the movement direction of the robot 1 to visually provide guidance information to the user following the display 170. For example, the display 170 may perform a function for displaying visual information (e.g., airport gate inquiry information, route guidance service information, etc.) related to a currently provided service. For example, the robot 1 may first move along a set route in order to guide the user along the route. In addition, the user may view the display 170 installed on the rear side of the robot 1 while following the robot 1. That is, even when the robot 1 travels for route guidance, the user may easily view service information displayed on the display 170 while following the robot 1.

The head 180 may be located on the body 100. Specifically, the head 180 may be connected to the upper end of the body 100 to form the upper portion of the robot 1. The head 180 may include a head case 185 for protecting the internal configuration of the operation unit (or user input device) 183 for receiving a command from the user.

The operation unit 183 may include, for example, a touchscreen for receiving touch input from the user or displaying a variety of information. The touchscreen may include a touch panel for receiving touch input and a display for displaying a variety of information. In addition, the operation unit 183 may further include an object recognition sensor.

The object recognition sensor may include a 2D camera and a red, green, blue, distance (RGBD) sensor. The 2D camera may be a sensor for recognizing a person or an object based on a 2D image. In addition, the 2D camera and the RGBD sensor may acquire the position or the facial image of a person. In one example, the first camera 16 may correspond to the object recognition sensor.

The head case 185 may be connected to the upper case 15. In addition, the head case 185 and the upper case 15 may be integrally formed in a single component such that the upper case 15 extends upward to have a dome shape. In addition, the head case 185 may be configured to rotate by a prescribed rotational distance (e.g., 360 degrees). In addition, the head 180 may further include a microphone (not shown). The microphone may perform a function for receiving a command in an audio signal from the user.

The lower module 20 may include a lower case 25 forming appearance and an illumination unit 280. The lower case 25 may have a cylindrical shape with a diameter increasing downward. In addition, the illumination unit 280 may be provided at the lower portion of the lower case 25, and the illumination unit 280 and the lower case 25 may be formed integrally as a single component. For example, the lower module 20 may have a jar shape associated with the combination of the illumination unit 280 and the lower case 25. The illumination unit 280 may provide various illuminations according to the function of the robot 1, as will be described below.

The upper case 15 and the lower case 25 may be formed to have a continuous shape in a vertical direction. For example, the upper case 15 may have a cylindrical shape with a diameter increasing downward, and the lower case 25 may have a cylindrical shape with a diameter increasing downward at a similar rate as the diameter increase rate of the upper case 15. Accordingly, the diameter of the upper end of the lower case 25 may be substantially equal to or greater than that of the lower end of the upper case 15. Accordingly, when the upper module 10 and the lower module 20 are coupled, the lower case 25 and the upper case 15 may form a continuous appearance in the upper-and-lower direction.

The lower module 20 may further include a plurality of ultrasonic sensors (not shown) spaced apart from each other and formed on one side of the lower case 25. For example, the plurality of ultrasonic sensors may be spaced apart from each other by a certain distance along the circumference of the lower end of the lower case 25. The ultrasonic sensors may perform a function for determining a distance between an obstacle and the robot 1 using ultrasonic signals. In addition, the ultrasonic sensors may perform a function for detecting an obstacle approaching the robot 1.

The upper module 10 and the lower module 20 are formed independently of each other in the structure and thus may be separated from or coupled to each other. Accordingly, the lower end of the upper module 10 and the upper end of the lower module 20 may be provided with a configuration for mutual hardware and software connection. For example, a main power switch 271, an input assembly, a connection guide, etc. may be located on the lower end of the upper module 10 and the upper end of the lower module 20.

Figure 3:
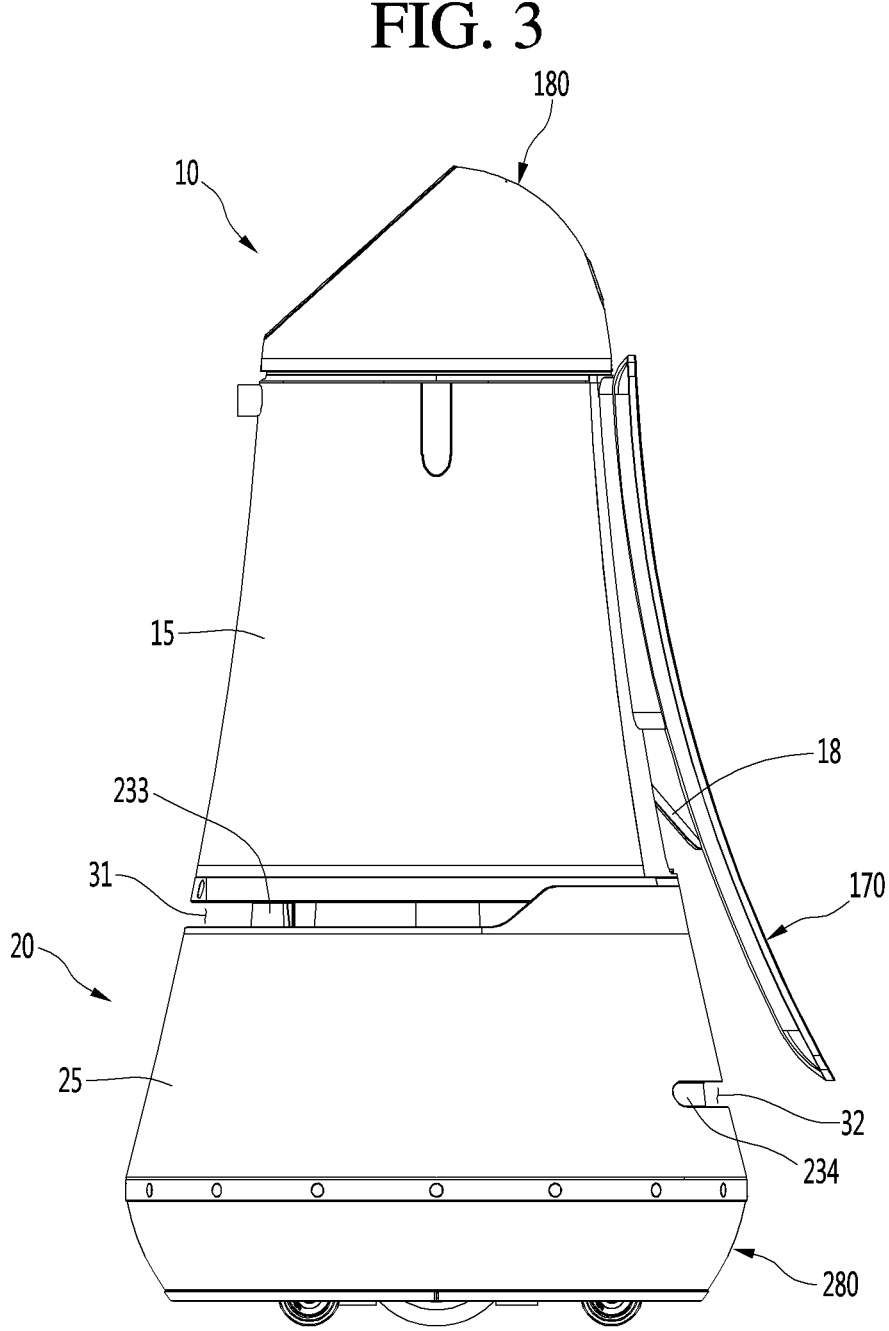
FIG. 3 is a side view showing the external appearance of the robot shown in FIG. 1.

FIG. 3 is a side view showing the external appearance of the robot 1 shown in FIG. 1. Referring to FIG. 3, the upper module 10 may include a sub case (or under case) 18 rotatably connected to the upper case 15. In addition, the main power switch 271 and a power plug (not shown) may be exposed to the outside according to rotation of the sub case 18.

An opening may be formed in a lower end of the upper case 15, in order to improve accessibility to the main power switch 271 provided in the lower module 20 and the power plug for charging a battery. The main power switch 271 and the power plug may be located in the opening. In addition, the opening may be formed in the rear side of the upper case 15, and may be located at the lower side of a connection opening opened or closed depending on whether the display 170 is connected. In addition, the opening may be formed by extending the connection opening downward.

The sub case 18 may be rotatably connected to the upper case 15 to open or close the upper case 15. For example, the sub case 18 may be connected to the upper case 15 through rotation hinges. The rotation hinges may be provided at the side edges of the sub case 18, for coupling with the upper case 15. For example, the lower end of the sub case 18 may move outward, such that the main power switch 271 or the power plug may be exposed to the outside. In this open position, an operator may turn on/off the main power switch 271 or connect a power plug. When the operator releases the sub case 18, the sub case 18 may be returned to an original position by elastic force, thereby shielding the opening again.

As shown in the drawings, the lower case 25 may include a first cut portion (or first recess) 31 and a second cut portion (or second recess) 32. The first cut portion 31 may be formed in the front surface of the lower case 25. For example, the first cut portion 31 may be formed such that the upper end of the lower case 25 and the lower end of the upper case 15 are spaced apart from each other. For example, the first cut portion 31 may be understood as an opening between the upper case 15 and the lower case 25 to enable a front lidar 233 (or other sensor) to operate. In addition, the first cut portion 31 may function as a handle by providing a gripping surface (e.g., an upper surface of the first cut portion 31) capable of allowing a user to support the upper module 10 at the lower end when the upper module 10 and the lower module 20 are coupled or separated.

The front lidar 233 may be located inside the lower case 25. In addition, the first cut portion 31 may be formed along the circumference of the lower case 25 at a point corresponding to the position of the front lidar 233. Accordingly, the front lidar 233 may be exposed to the outside by the first cut portion 31.

The second cut portion 32 may be formed in the rear surface of the lower case 25. The second cut portion 32 may be an opening in the lower case 25 to enable a rear lidar 234 (or other sensor) to operate. For example, the second cut portion 32 may be extend in the rear surface of the lower case 25 by a certain length in a radius direction, and the rear lidar 234 may be located inside the lower case 25. In addition, the second cut portion 32 may be formed to be cut along the circumference of the lower case 25 at a point corresponding to the position of the rear lidar 234. Accordingly, the rear lidar 234 may be exposed to the outside by the second cut portion 32. In addition, the first cut portion 31 may be spaced apart from the second cut portion 32 in the vertical direction. For example, the first cut portion 31 may be located above the second cut portion 32.

The front lidar 233 and the rear lidar 234 are laser radars that include laser emitters for emitting laser beams and sensors for collecting and analyzing reflections of the lasers and performing position recognition based on analyzing the detected laser reflections. In addition, when the emitted laser beams are reflected from an object, the front lidar 233 and the rear lidar 234 may receive the reflected laser beams. The robot 1 may detect a presence and a position of the object located around the robot 1 based on the received laser beams. The front lidar 233 and the rear lidar 234 may be provided in the lower module 20 to efficiently detect an object having a low height. For example, the front lidar 233 and the rear lidar 234 may be provided in the lower module 20 to easily detect a user having a low height (e.g., a child or a person in a wheelchair).

Figure 4:
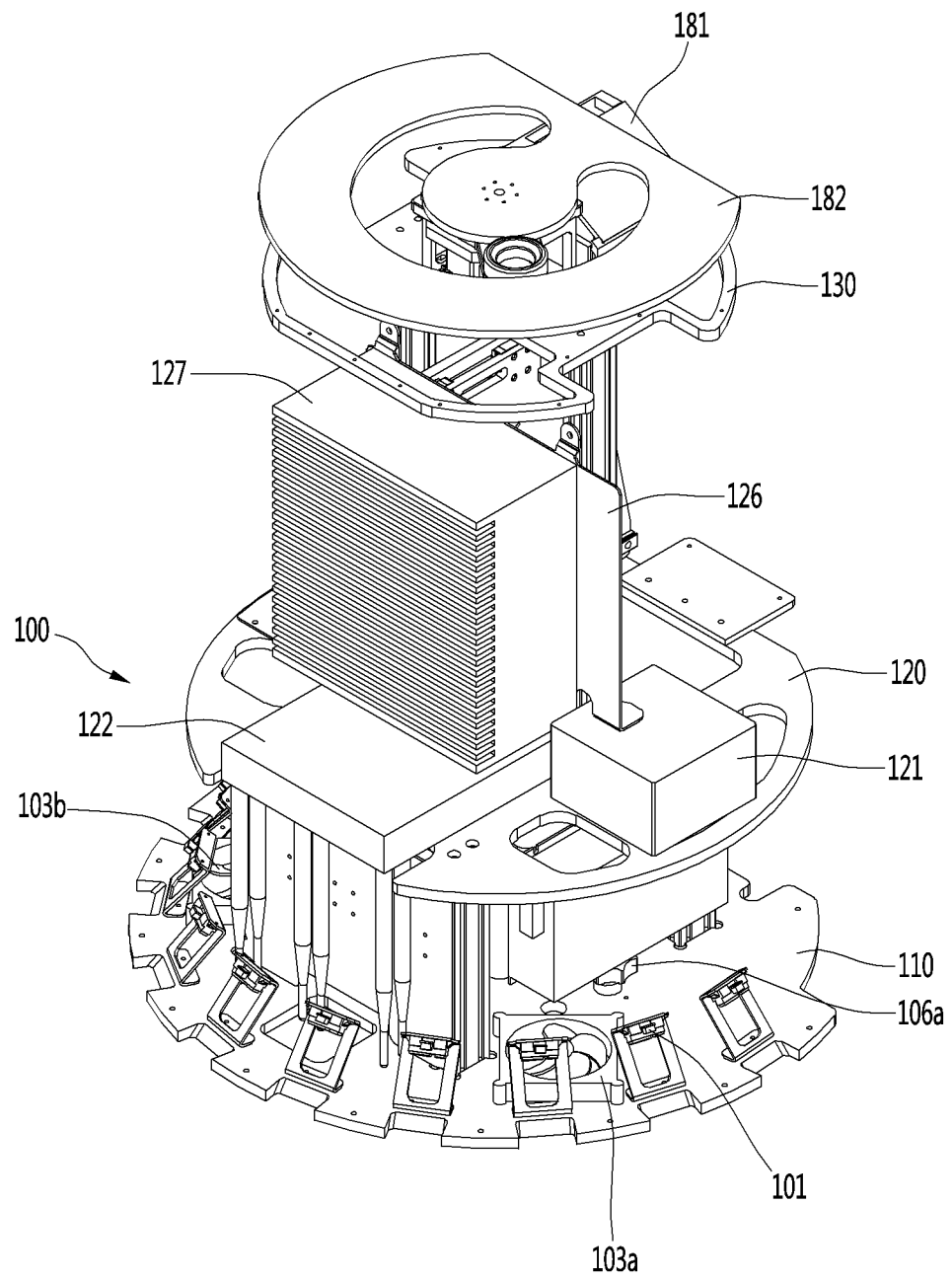
FIG. 4 is a view showing the inside of the upper module of the robot of FIG. 1.

FIG. 4 is a view showing an example of an inside of the upper module 10 of FIG. 1. Referring to FIG. 4, the body 100 may include a base plate 110 providing a bottom of the upper module 10, a middle plate 120 located above the base plate 110, and a top plate 130 located above the middle plate 120.

The base plate 110 may provide the base surface of the upper module 10. The base plate 110 may be formed in a disc shape. In addition, the base plate 110 may be formed to have an outer circumference larger than that of the middle plate 120. In addition, the middle plate 120 may be formed to have an outer circumference than that of the top plate 130. Accordingly, the upper case 15 may have a diameter increasing downward when the base plate 110, the middle plate 120 and the top plate 130 are coupled.

The base plate 110 may be seated in the lower module 20 to be coupled or separated to or from the lower module. Accordingly, the base plate 110 may include a component for coupling with or separation from the lower module 20. For example, the body 100 may further include a fastening member 106a (e.g., a screw or bolt) for fastening the base plate 110 to the lower module 20.

Meanwhile, the base plate 110 may fix and support the components of the upper module 10 at a lowermost end thereof, and is seated in the lower module 20 such that the upper module 10 and the lower module 20 are stably coupled or separated.

The body 100 may include a cliff detection sensor 101 coupled with the lower module 20 to complement the traveling function of the robot 1. The cliff detection sensor 101 may perform a function for detecting a step of the traveling surface on which the robot 1 moves. When a cliff or an obstacle is detected during traveling, the robot 1 may stop or avoid the cliff or the obstacle.

The body 100 may further include a main printed circuit (PC) 127 capable of providing a user interface (UI) according to various service environments. The main PC 127 may be located above the middle plate 120. In addition, the main PC 127 may be coupled to a PC supporter (or PC frame) 126 to be fixed and supported. For example, the main PC 127 may be located on a front surface of the PC supporter 126.

The main PC 127 may set the UI according to various service environments provided by the robot 1. For example, the main PC 127 may differently set the UI according to the service environments to provide a robot service suitable for an individual service environment. When the main PC 127 changes settings of the UI according to the operation service environment in which the robot 1 operates, a component for providing a visual screen, such as the display 170 and/or the operation unit 183, may provide a visual screen to the user according to the changed UI settings. Here, the component for providing the visual screen, such as the display 170 and the operation unit 183, may be referred to as the display 672 (see FIG. 6) of the robot 1.

In addition, the main PC 127 may continuously upgrade a program, thereby continuously developing and providing a service suiting the operation service environment of the robot 1. For example, the robot 1 according to the embodiment of the present disclosure may change the set UI according to the service environment in which the robot 1 is used. However, the structure may be changed according to the service environment in which the robot 1 is used. For example, when a route guidance service is provided to a user in an airport and a department store, the UI may be changed to suit the environment of the airport or the department store. In particular, the structural change of the upper portion of the robot, in which input of the command of the user is performed and subsidiary communication is performed, may frequently occur. In addition, if the structural change is necessary in the conventional robot, traveling related components which are commonly used in two service environments need to be redesigned.

The robot 1 according to an embodiment of the present disclosure may independently divide and provide components to the upper module 10 and the lower module 20. For example, in the robot 1 according to the embodiment of the present disclosure, the lower module 20 may be provided with a traveling function which may be commonly used, and the upper module 10 in which structural change frequently occurs may be provided to be coupled to or separated from the lower module 10.

Meanwhile, heat generated by the main PC 127 may escape to the outside by a first cooler 103*a* and a second cooler 103*b* provided in the base plate 110. For example, the first cooler 103*a* and the second cooler 103*b* may perform a heat dissipation function with respect to the upper module 10.

The body 100 may include various types of boards for controlling operation of the robot 1. For example, the body 100 may, in addition or alternatively to the main PC 127, further include a main board 121, a user interface board (not shown, and/or a stereo board (not shown). The main board 121 may be located on the middle plate 120. The main board 121 may be connected to the main PC 127 to perform a function for stably driving the main PC 127 and performing data exchange between various control devices.

The user interface board may be connected to the main PC 127 to control operation of a component responsible for user input/output. The stereo board may serve to process the sensing data collected from various types of sensors and the camera and to manage data for position recognition and obstacle recognition of the robot 1.

The body 100 may further include a communication apparatus (or communication interface) 122 capable of performing communication between the upper module 10 and an external apparatus or the upper module 10 and the lower module 20. For example, the communication apparatus 122 may include a communications processor to generate or decode signals according to one or more communications protocol and a transceiver to transceive the signals. The communication apparatus 122 may be located above the middle plate 120. In addition, the communication apparatus 122 may include an internet protocol (IP) router.

The head 180 may further include a reader 181. The reader 181 may be located above the top plate 130.

The reader 181 may include, for example, in emitter to output infrared light or other radiation and may scan or recognize a document (e.g., a passport, airline ticket, mobile barcode, etc.) of the user based on a reflection of the outputted radiation from the document. Accordingly, information for the user may be displayed through the display 170 based on the information acquired through the reader 181. For example, when the user inserts a mobile device into the reader 181, the reader may recognize a displayed barcode of a mobile boarding pass, and the display 170 may display guidance data about a boarding gate, to which the user should move, based on acquired information associated with the mobile boarding pass.

The head 180 may further include a rotation member (or rotational plate) 182 and a head motor (not shown). The head motor may be located at the center of the top plate 130. In addition, the rotation member 182 may be connected to the head motor in an upward direction. The head case 185 may be coupled to the edge of the rotation member 182. Accordingly, the head case 185 may rotate by rotation of the rotation member 182. The head motor may provide power for rotating the rotation member 182.

Figure 5:
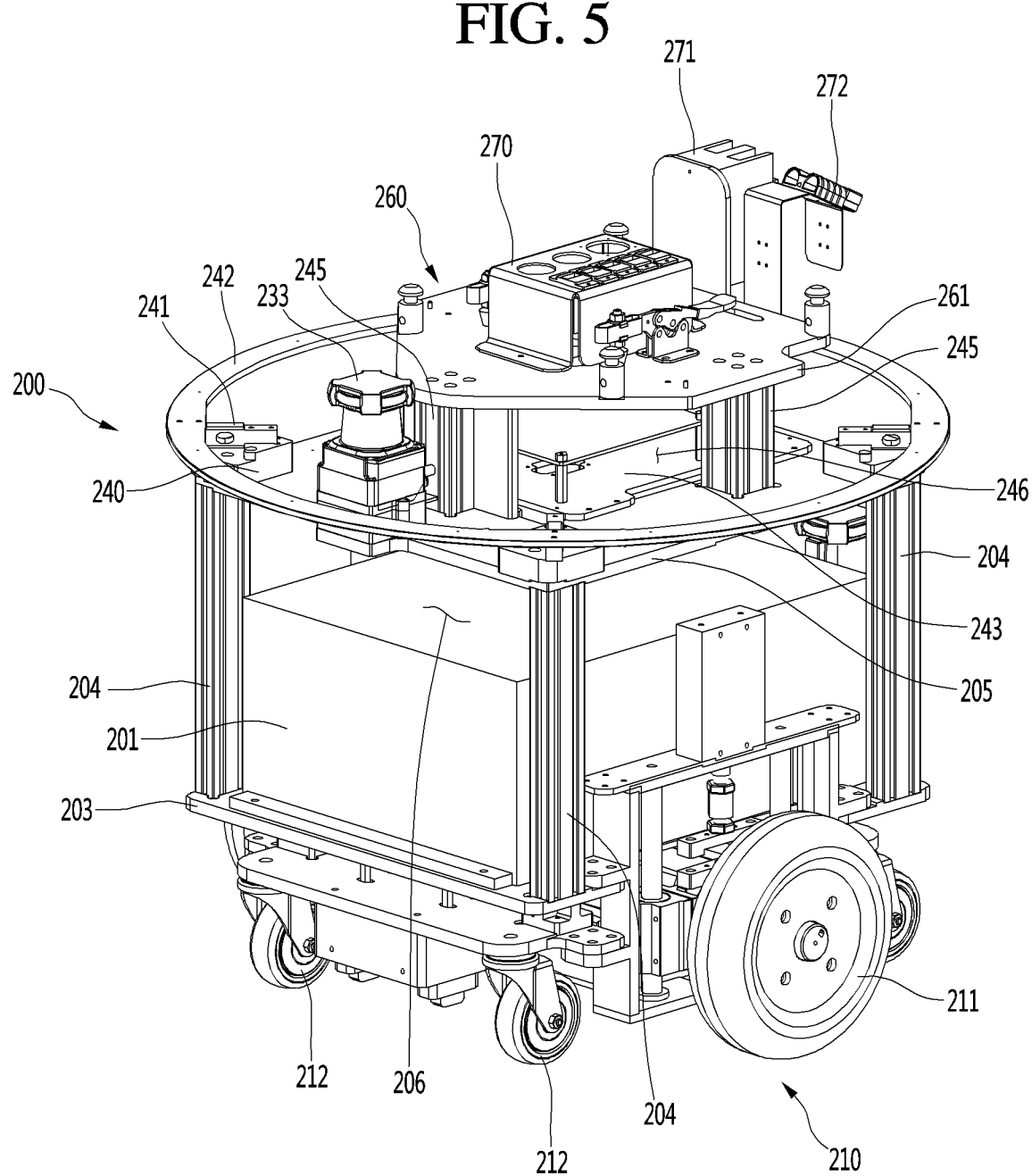
FIG. 5 is a view showing the inside of the lower module of the robot of FIG. 1.

FIG. 5 is a view showing the inside of the lower module 20 of a robot 1 shown in FIG. 1. As described above, the upper module 10 performs the UI function which may be changed according to various service environments of the robot 1, and the lower module 20 performs a traveling function which is unlikely to be changed even in various service environments. For the traveling function of the robot 1, the lower module 20 may include a traveling unit 210 that includes wheels, motors, etc., a driving unit 200 including a battery capable of providing power to the traveling unit 210, and a connector (or connector plate) 260 for coupling with the upper module 10.

The driving unit 200 may include a lower plate 203 forming a base surface of the lower module 20, a battery 201 seated on the lower plate 203, an upper plate 205 located above the battery 201, and lower frames (or lower frame posts) 204 connecting the lower plate 203 with the upper plate 205. The lower plate 203 may form the bottom of the lower module 20. In addition, the lower plate 203 may be connected to the traveling unit 210. The lower plate 203 may have various shapes. For example, the lower plate 203 may be formed as a rectangular plate.

The lower frames 204 may extend upward from an end of the lower plate 203. For example, a plurality of lower frames 204 may be provided at positions corresponding to the vertexes of the lower plate 203. The lower frames 204 may be vertically connected to the lower plate 203 and the upper plate 206. Specifically, the lower frames 204 may be coupled to the upper surface of the lower plate 203 and the lower surface of the upper plate 205. In addition, the lower frames 204 may have a hexahedral columnar shape extending in one direction.

A hole may be formed in the center of the upper plate 205. A plate 243, on which a plurality of electronic apparatuses is installed, may be provided in the hole of the upper plate 205. The upper plate 205 may have various shapes. For example, the upper plate 205 may be formed as a rectangular plate. The size of the upper plate 205 may correspond to a size of the lower plate 203. Accordingly, the position of coupling between the lower plate 203 and the lower frames 204 may correspond to the position of coupling between the upper plate 205 and the lower frames 204. However, the size of the upper plate 206 is not limited to the size of the lower plate 203. The lower surface of the upper plate 205 may be connected to the lower frames 204 and the upper surface thereof may be connected to upper frames 245.

The lower plate 203, the lower frames 204 and the upper plate 205 may have a rectangular parallelepiped shape with a hollow internal space. In addition, the internal space between the lower plate 203 and the upper plate 205 is referred to as an installation space 206. The installation space 206 may be understood as a space where the battery 201 having a relatively large weight is located.

The battery 201 may include a lithium ion battery, without being limited thereto. It should be appreciated that the battery 201 may include different types of batteries in addition to or that differ from a lithium ion battery. The battery 201 may supply power for driving the robot 1. In addition, the battery 201 may be located in the installation space 206. Since the battery 201 typically occupies the largest portion of the total weight of the robot 1, it is preferable that the battery is seated on the upper surface of the lower plate 203 in terms of the center of gravity.

The driving unit 200 may further include the upper frames 245 supporting the connector 260 and the plate 243 located at the center of the upper plate 205. The plate 243 may be located at the center of the upper plate 205. A plurality of plates 243 may be provided to form a plurality of layers in a vertical lower direction. The plurality of plates 243 may be provided in a vertical direction to form the plurality of layers and the plurality of layers is referred to as a space 246. A plurality of electronic apparatuses may be located in the space 246. The plurality of electronic apparatuses may be coupled to the plate 243. For example, a plurality of boards may be provided in the space 246.

The upper frames 245 may be connected to the upper plate 205. The upper frames 245 may be located between the outer circumference of the upper plate 205 and the inner circumference of the center hole. For example, the upper frames 245 may be located such that a virtual triangle is formed on the upper surface of the upper plate 205 outside the plate 243. The upper frames 245 may be located at the vertexes of the virtual triangle.

In one configuration, a plurality of upper frames 245 may be provided to support the connector 260 at three points. For example, the upper frames 245 may include a first upper frame located in front of the plate 243 and second and third subframes located at both sides of the plate 243. A connection plate 261 of the connector 260 may be coupled to the upper sides of the first to third upper frames 245.

The upper frames 245 may be vertically coupled to the upper surface of the upper plate 205. In addition, the upper frame 245 may have a hexahedral columnar shape extending in one direction. In addition, since the upper frames 245 may fix and support the connector 260 for coupling with or separation from the upper module 10, for stable balance upon coupling the upper module 10 with the lower module 20, the vertical length of the upper frames 245 may be less than the vertical length of the lower frames 204.

The driving unit 200 may further include blocks 240 located above the upper plate 205, load sensors 241 located on the blocks 240, and a contact ring 242 located above the load sensors 241. The blocks 240 may extend upward at the vertexes of the upper plate 205. For example, the blocks 240 may be located outside the upper frames 245.

The load sensors 241 may be provided on the blocks 240. For example, the blocks 240 may fix and support the load sensors 241 and the contact ring 242. The plurality of load sensors 241 may be connected to the contact ring 242 to detect the load by force received from the contact ring 242. The number of blocks 240 may correspond to the number of load sensors 241.

The load sensors 241 may include a first load sensor, a second load sensor, a third load sensor and a fourth load sensor to correspond to the vertexes of the upper plate 205. The first to fourth load sensors 241 may be located outside the upper plate 205. In addition, the contact ring 242 may be connected along the outer ends of the first to fourth load sensors 241.

The contract ring 242 may be seated outwardly along the upper ends of the first to fourth load sensors 241. The contact ring 242 may be located above the blocks 240 and outwardly spaced apart from the blocks 240. The contract ring 242 may be formed in a ring shape. The outer diameter of the contact ring 242 may be relatively large such that the upper plate 205 is located inside the contact ring 242. In addition, the contract ring 242 may be connected to the lower case 25. Accordingly, when collision of the lower module 20 occurs, impact may be easily transmitted.

The load sensors 241 and the contract ring 242 may serve to detect collision of the lower module 20 to control traveling operation. For example, when collision of the lower module 20 occurs, the contract ring 242 may be twisted by impact received by the lower case 25. For example, momentum is generated in the contract ring 242 and the load sensors 241 detect the momentum and transmit signals. A controller (e.g., controller 690 in FIG. 6) may perform control based on receiving the signals of the load sensors 241 to stop rolling motion of the traveling unit 210. Accordingly, it is possible to improve safety of traveling of the robot 1.

The lower plate 203 may be connected to the traveling unit 210 for performing the movement function of the robot 1. The traveling unit 210 may include main wheels (e.g., driving wheels) 211, auxiliary wheels (e.g., driven wheels) 212 and suspensions (not shown), such that the lower module 20 easily moves. For example, the traveling unit 210 may provide movement capability to the robot 1.

The suspensions (not shown) may be located on opposite sides of the lower plate 203. For example, the suspensions may be coupled to both ends of the lower plate 203. In addition, the suspensions may be connected to the main wheels 211 located on the outside thereof.

The main wheels 211 may be connected to both sides of the lower plate 203. For example, the main wheels 211 may be connected to a motor assembly (not shown) located on the lower surface of the lower plate 203. In addition, the motors receive power from the battery 201 to rotate, thereby providing rotation force to the main wheels 211. The main wheels 211 may receive the rotation force of the motors and perform rolling motion, such that the lower module 20 travels. In addition, as described above, the main wheels 211 may be connected to the suspensions and located outside the suspensions.

The main wheels 211 provided on both sides of the lower plate 203 may independently rotate by corresponding motors. When the motors provide a corresponding rotation force to the main wheels 211, the robot 1 may travel straight forward or backward. In contrast, when the motors provide different rotation forces to the main wheels 211, the robot 1 may curve or rotate.

The auxiliary wheels 212 may be located below the lower plate 203. For example, the auxiliary wheels 212 may be coupled to auxiliary wheel plates connected downwardly to the front and rear ends of the lower plate 203. A plurality of auxiliary wheels 212 may be provided. The plurality of auxiliary wheels 212 may stably support the lower module 20 in the front-and-rear direction of the lower surface of the lower plate 203. For example, the auxiliary wheels 212 may serve to keep balance of the lower module 20 such that the lower module 20 stably travels.

The auxiliary wheels 212 may perform rolling motion based on a rotation of the main wheels 211 due to a driving force from the motors. For example, the auxiliary wheels 212 may not independently rotate and may perform rolling motion depending on the rotation of the main wheels 211. The auxiliary wheels 212 may include casters.

Figure 6:
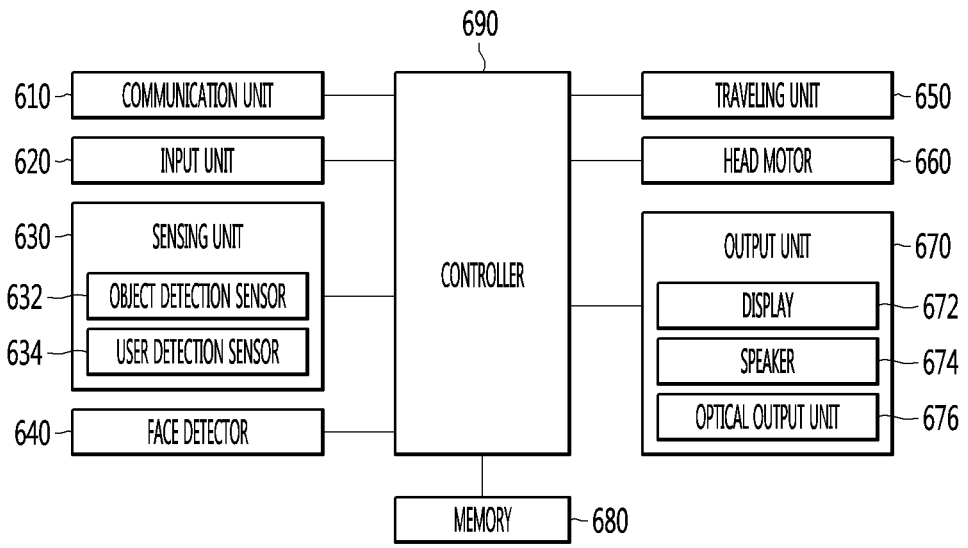
FIG. 6 is a diagram schematically showing the control configuration of a robot according to an embodiment of the present disclosure.

FIG. 6 is a block diagram schematically showing the control configuration of a robot 1 according to an embodiment of the present disclosure. In FIG. 6, the robot 1 includes a communication unit 610, an input unit 620, a sensing unit 630, a face detector 640, a traveling unit 650, a head motor 660, an output unit 670, a memory 680 and a controller 690. However, the components of FIG. 6 are shown for convenience of description and are not essential for implementing the robot 1, and thus the robot 1 may include some of the components shown in FIG. 6 and omit other components shown in FIG. 6. In addition, in some embodiments, the robot 1 may include the components shown in FIG. 6 and further include additional control components.

The communication unit (or communication interface) 610 may include at least one communication module for connecting the robot 1 to a server, a terminal or another robot through a network. For example, the communication unit 610 may include a short-range communication module such as Bluetooth® or near field communication (NFC), a wireless Internet module such as Wi-Fi®, or a mobile communication module. The controller 690 may transmit status information or operation information of the robot 1, user input received through the input unit 620 or a variety of detected data acquired by the sensing unit 630 or the face detector 640 to the server, the terminal and/or another robot through the communication unit 610. In addition, the controller 690 may receive the control information of the robot 1 from a remote server or terminal through the communication unit 610.

The input unit (or input device) 620 may include at least one input device for inputting predetermined signals or data to the robot 1 by user operation or the other action. For example, the input device may include a button, a dial, a touch pad, a microphone, etc. The user may input a request or a command to the robot 1 by operating the button, the dial and/or the touch pad. In addition, the user may input a voice request or command to the robot 1 through the microphone.

The sensing unit 630 may include at least one sensor for detecting an object present within a predetermined distance from the robot 1. For example, the sensing unit 630 in certain embodiments may detect whether a user is approaching the robot 1, by distinguishing the approaching user from the other detected objects or other users. Hereinafter, in this specification, the user may mean a person. The user may be understood as including a person having an intention to interact with the robot 1 and a person without an intention to interact with the robot 1.

The sensing unit 630 may also include an object detection sensor 632 for detecting an object present within a predetermined distance from the robot 1. For example, the object detection sensor 632 may include a lidar sensor, without being limited thereto, and may include other sensors such as an ultrasonic sensor. For example, the object detection sensor 632 may include at least one lidar sensor for detecting an object in all directions of the robot 1. For example, in the robot 1 shown in FIGS. 1 to 5, the object detection sensor 632 may mean a front lidar 233 and a rear lidar 234. The lidar sensor may emit laser beams and receive laser beams reflected from the object. The lidar sensor may detect presence and position of the object based on the received laser beams.

The sensing unit 630 may include a user detection sensor 634 for detecting whether the detected object is a user. For example, the user detection sensor may be implemented as a 3D stereo camera (e.g., first camera 16). In some embodiments, the user detection sensor may be implemented for distinguishing the user from the other objects among various objects. The image acquired by the 3D stereo camera may include depth information of each pixel. The controller 690 may detect whether the object is a user using each pixel value of the acquired image and the depth information.

The user detection sensor 634 may include at least one 3D stereo camera in order to acquire images in one or more directions of the robot 1 to detect the user. In this example, when the object is detected by the lidar sensor 632, the controller 690 may control the 3D stereo camera facing the detected object among at least one 3D stereo camera, thereby acquiring an image including the object.

In the robot 1 shown in FIGS. 1 to 5, the 3D stereo camera may correspond to the first camera 16 provided in the body 100. In the embodiment of FIGS. 1 to 5, if the robot 1 includes one 3D stereo camera, the image may not be acquired in all directions. In this example, when the object is detected by the object detection sensor 632, the controller 690 may rotate the body 100 such that the 3D stereo camera faces the object. For example, the controller 690 may control the traveling unit 650 to change the traveling direction. As the traveling direction is changed, the body 100 may rotate. In some embodiments, if a separate motor for horizontally rotating the body 100 is provided in the robot 1, the controller 690 may control the motor to rotate the body 100.

The face detector (or camera) 640 may detect the face of the detected user, when the user is detected by the sensing unit 630. The face detector 640 may include at least one camera for acquiring an image including the face of the user.

The controller 690 may detect an interaction intention based on attributes of the face of the user included in the acquired image. When the user wants to interact with the robot 1, the line of sight of the user generally faces the robot 1. For example, the controller 690 may detect the direction of the line of sight of the user from the acquired image and detect that the user has an interaction intention when the direction of the line of sight of the user faces the robot 1. For example, in the robot 1 shown in FIGS. 1 to 5, the face detector 640 may include at least one of a 2D camera or an RGBD sensor provided in the head 180. The controller 690 may control the head motor 660 to rotate the head 180 such that the face detector 640 faces the user.

The head 180 is provided with the operation unit 183 such as a touchscreen, and the controller 690 may display a visual screen through the operation unit 183. Therefore, the line of sight of the user having the intention to interact with the robot 1 may face the head 180. For example, the face detector 640 may be included in the head 180, thereby efficiently detecting whether the line of sight of the user faces the head 180. Therefore, the robot 1 may more accurately detect the interaction intention of the user.

The traveling unit 650 is a component for movement of the robot 1. For example, the traveling unit 650 may include the wheels 211 provided in the lower module 20 and the motors for providing rotation force to the wheels 211. For example, in the robot 1 shown in FIGS. 1 to 5, the wheels 211 may include a first wheel and a second wheel disposed at opposite sides of the lower module 20, and the motors may include a first motor for providing rotation force to the first wheel and a second motor for providing rotation force to the second wheel. When the controller 690 controls the first motor and the second motor to provide a similar force in a similar direction, the robot 1 may travel straight forward or backward. In contrast, when the controller 690 controls the first motor and the second motor to provide different amounts of force and/or forces in different directions, the robot 1 may curve or rotate. As the robot 1 rotates, the body 110 may rotate.

The output unit (or output module) 670 may output a variety of information related to the operation or status of the robot 1 or the service provided by the robot 1. In addition, the output unit 670 may output various types of messages or information for interaction with the user. For example, the output unit 670 may include at least one of a display 672, a speaker 674 or an optical output unit 676. In one example, the output unit 670 may be provided separately of the robot 1, such as on a remote terminal provided in the service environment (e.g., on a display provided in an airport) or to a user device (e.g., a smart device associated with the user). For example, the controller 690 may selectively direct communication unit 610 for forward instructions to a remote device to output audio and/or visual content.

The display 672 may output the various types of messages or information in the form of graphic and the speaker 674 may audibly output the various types of messages or information. In the embodiment of the robot 1 shown in FIGS. 1 to 5, the display 672 may be understood as including the display 170 and the touchscreen of the operation unit 183. The speaker 674 may be provided in the body 100 or the head 180.

The optical output unit 676 may output light having a specific color or pattern in correspondence with the various types of messages or information. The optical output unit 676 may be used as an auxiliary output means at the time of the output of the display 672 or the speaker 674, without being limited thereto.

Various data, such as control data for controlling operation of the components included in the robot 1 and data for performing operation corresponding to input acquired through the input unit 620, may be stored in the memory 680. The detected data acquired through the object detection sensor 632 and the user detection sensor 634 of the sensing unit 630 may be stored, and an algorithm for detecting the user based on the detected data and data related thereto may be stored, in the memory 680. In addition, an image acquired through the face detector 640 may be stored, and an algorithm for detecting an interaction intention of the user from the image and data related thereto may be stored, in the memory 680.

The controller 690 may include circuitry (e.g., main PC 127 and/or main board 121) included in the robot 1 and may perform overall operation of the robot 1. For example, the controller 690 may control at least one sensor 632 and 634 included in the sensing unit 630 to detect the user located around the robot 1. In addition, the controller 690 may control the face detector 640 to acquire an image including the face of the detected user and to detect the interaction intention of the user based on the acquired image. When the interaction intention is detected, the controller 690 may output guidance sound or a guidance screen for performing interaction with the user.

The robot 1 may provide various information to the user and perform guidance operation through interaction with the user. In one implementation, the user operates the operation unit 183 of the robot 1 or utters a startup word for interaction with the robot 1. However, the user directly operating the operation unit 183 may be troublesome, and, when an advertisement screen is displayed on the operation unit 183 instead of a menu screen, interaction with the robot 1 may be delayed or may not be performed. In addition, when the robot 1 is placed in a space where many users are present, such as an airport or a department store, the robot 1 may not easily recognize the startup word uttered by the user due to noise.

According to the embodiment of the present disclosure, the robot 1 may automatically detect an intention of the user to interact with the robot 1 without receiving separate operation or a startup word from the user, thereby more effectively initiating an interaction with the user. Various embodiments related thereto will be described with reference to FIGS. 7 to 19.

Figure 7:
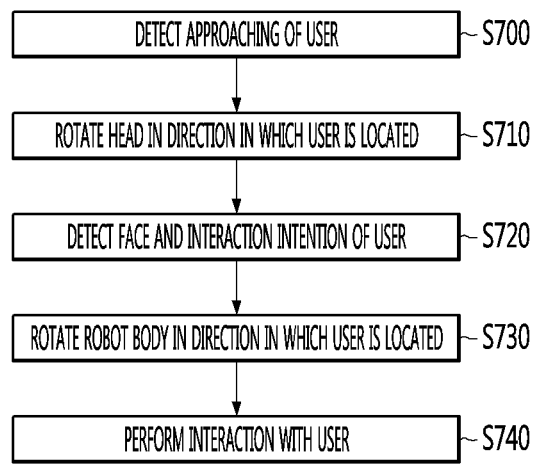
FIG. 7 is a flowchart schematically illustrating control operation of a robot according to an embodiment of the present disclosure.

FIG. 7 is a flowchart schematically illustrating control operation of a robot 1 according to an embodiment of the present disclosure. Hereinafter, in this specification, for convenience of description, assume that the robot for performing various control operations according to the embodiment of the present disclosure is the robot 1 shown in FIGS. 1 to 5. In addition, as described above, in this specification, the user may be understood as including a person having an interaction intention (e.g., a desire to interact with the robot to request a service) or a person without an interaction intention.

Referring to FIG. 7, the robot 1 may detect an approaching of the user (S700). The controller 690 of the robot 1 may detect a user present within a predetermined distance from the robot 1 using the sensors 632 and 634 included in the sensing unit 630. In addition, the controller 690 may detect the approaching of the user based on the positional change of the detected user. This will be described in greater detail with reference to FIGS. 8 to 9.

When the approaching of the user is detected, the robot 1 may rotate the head 180 in a direction in which the detected user is located (S710). The controller 690 may control the head motor 660 to rotate the head 180 such that the face detector 640 provided in the head 180 (or other portion of the robot 1) faces the user.

The robot 1 may detect the face of the user and determine whether the user has the interaction intention (S720). For example, the controller 690 may control the face detector 640 to acquire the image including the face of the user and to detect the user's intention to interact with the robot 1. Embodiments related thereto will be described with reference to FIGS. 10 to 14.

If the interaction intention is detected (e.g., the robot determines that the user wishes to interact with the robot), the robot 1 rotates the robot body in a direction in which the detected user is located (S730), and perform interaction with the user (S740). For example, when the interaction intention of the user is detected, the controller 690 may control the traveling unit 650 such that the front side of the body 100 faces the user.

In some embodiments, the controller 690 may control the traveling unit 650 such that the robot 1 travels toward the user after the front side of the body 100 faces the user. For example, the controller 690 may autonomously travel toward the user having the detected interaction intention, thereby more improving user convenience by reducing the user's required movement toward the robot 1.

Robot may perform various services for the detected user having the interaction intention. For example, the controller 690 may control the output unit 670 to output guidance such as guidance sound or a guidance screen for interaction with the user. The user may request a specific service based on the output guidance, and the controller 690 may provide a service to the user in response to the received request, thereby performing interaction with the user. For example, according to the embodiment of the present disclosure, the robot 1 may autonomously detect the interaction intention of the user without receiving separate operation input or voice input from the user, thereby more effectively performing interaction with the user.

Figure 8:
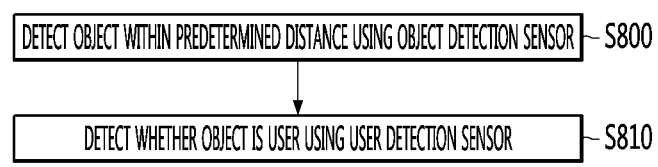
FIGS. 8 and 9 are views illustrating an example of operation of detecting an approach of a user at a robot according to an embodiment of the present disclosure.
Figure 9:
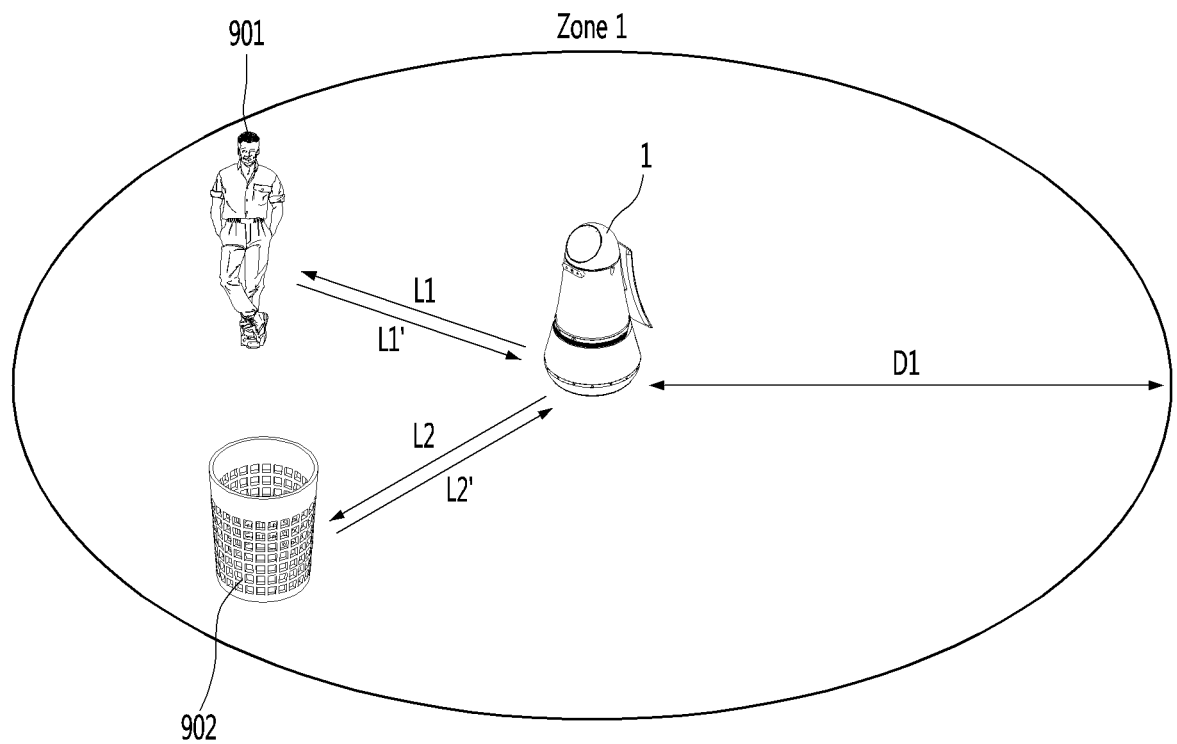

More specific embodiments related to each control operation of the robot 1 described above with respect to FIG. 7 will now be described with reference to FIGS. 8 to 18. FIGS. 8 and 9 are views illustrating an example of operation of detecting an approach of a user at a robot 1 according to the present disclosure. Referring to FIGS. 8 and 9, the robot 1 may detect an object present within a predetermined distance D1 through the object detection sensor 632 (S800).

As previously described, the object detection sensor 632 includes the front lidar 233 and the rear lidar 234 of the robot 1. The controller 690 may detect whether an object is present within the predetermined distance D1 from the robot 1 using the front lidar 233 and the rear lidar 234. As described above, the controller 690 may control the front lidar 233 and the rear lidar 234 to emit laser beams, receive laser beams reflected from the object, and detect presence of the object based on the received laser beams. The predetermined distance D1 may be equal to or less than the maximum detection distance of the object detection sensor 632.

Referring to FIG. 9, objects 901 and 902 may be present in a detection zone (Zone 1) within the predetermined distance D1 from the robot 1. In this example, a first laser beam L1 emitted from the front lidar 233 or the rear lidar 234 may be reflected by the first object 901 and the front lidar 233 or the rear lidar 234 may receive the reflected first laser beam L1'. In addition, a second laser beam L2 emitted from the front lidar 233 or the rear lidar 234 is reflected by the second object 902 and the front lidar 233 or the rear lidar 234 may receive the reflected second laser beam L2'.

The controller 690 may detect the first object 901 and the second object 902 based on the reflected first laser beam L1' and the reflected second laser beam L2'. In addition, the controller 690 may recognize the position of the first object 901 based on the reception direction and time of the reflected first laser beam L1, and recognize the position of the second object 902 based on the reception direction and time of the reflected second laser beam L2'. For example, the controller 690 may define the recognized positions in the form of two-dimensional coordinates.

As previously described, the front lidar 233 and the rear lidar 234 may be disposed in the lower module 20, thereby effectively detecting an obstacle having a low height. For example, the front lidar 233 and the rear lidar 234 may effectively detect a user having a low height (e.g., a child).

When an object is detected, the robot 1 may detect whether the object is a user using the user detection sensor 634 (S810). For example, when the object is detected by the object detection sensor 632, the controller 690 may detect whether the object is a user using the user detection sensor 634.

For example, the user detection sensor 634 includes a first camera 16 provided in the body 100 of the robot 1. In this case, the controller 690 may control the traveling unit 650 to rotate the body 100, such that the object is included in the image acquired by the first camera 16. When the body 100 rotates, the controller 690 may acquire an image including the object through the first camera 16.

For example, the controller 690 may rotate the body 100 such that the first object 901 is included in the image acquired by the first camera 16, and control the first camera 16 to acquire the image including the first object 901. In addition, the controller 690 may rotate the body 100 such that the second object 902 is included in the image acquired by the first camera 16, and control the first camera 16 to acquire the image including the second object 902. In some embodiments, if the user detection sensor 634 includes a plurality of 3D stereo cameras disposed in different directions, the controller 690 may control 3D stereo cameras capable of acquiring images including the object among the plurality of 3D stereo cameras, thereby acquiring the image.

The controller 690 may detect whether the object is a user based on the acquired image. The image acquired by the 3D stereo camera includes not only the pixel value (e.g., RGB data) indicating the color or shape of the object but also depth information indicating a distance between the object and the 3D stereo camera at each pixel (or some pixels). The controller 690 may detect whether the object is a user using the pixel value and the depth information. For example, data on the pixel value pattern and the depth information pattern of the user (person) and an algorithm for determining whether the object is a user may be stored in the memory 680. For example, the controller 690 may detect that the first object 901 is a user from the image including the first object 901. In addition, the controller 690 may detect that the second object 902 is not a user from the image including the second object 902.

In some embodiments, the controller 690 may control the front lidar 233 and the rear lidar 234 to periodically emit the laser beams, thereby detecting the positional change of the object. Upon detecting that the object is approaching the robot 1, the controller 690 may detect whether the approaching object is a user using the user detection sensor 634. Alternatively, the controller 690 may detect whether the object is approaching the robot 1 using the object detection sensor 632 and/or the user detection sensor 634 in parallel to step S610. The object approaching the robot 1 may mean that the distance between the object and the robot 1 decreases by movement of the object and/or the robot 1. For example, the controller 690 may perform step S720 and subsequent steps thereof when the object is a user.

Alternatively, the controller 690 may perform step S720 and subsequent steps thereof, upon detecting that the user is approaching the robot 1. For example, even when a user is present within the predetermined distance D1, the controller 690 performs step S720 and subsequent steps thereof only when the user is approaching the robot 1. Therefore, it is possible to minimize load waste of the robot 1.

Figure 10:
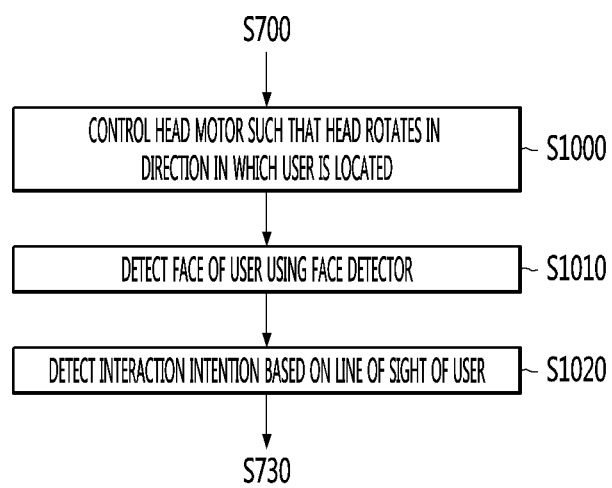
FIGS. 10 and 11 are views illustrating an example of operation of detecting an interaction intent by an approaching user detected by a robot of the present disclosure.
Figure 11:
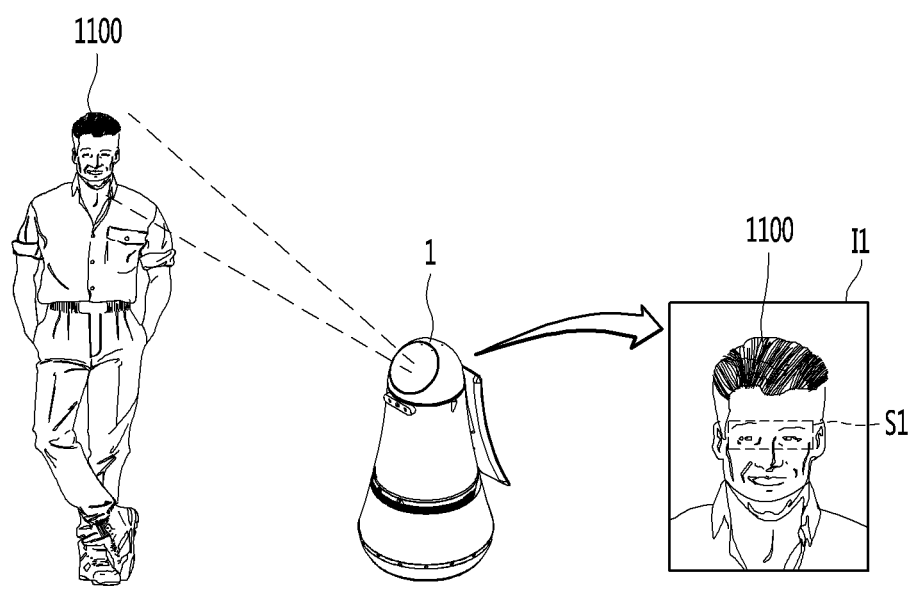

FIGS. 10 and 11 are views illustrating an example of operation of detecting an interaction intention of a user, approaching of which is detected by a robot 1 of the present disclosure. Referring to FIGS. 10 to 11, when approaching of the user is detected, the robot 1 may control the head motor 660 to rotate the head 180 in a direction in which the detected user is located (S1000).

When approaching of a user 1100 is detected by the sensing unit 630, the controller 690 may rotate the head 180 such that the operation unit 183 and the face detector 640 face the detected user 1100. The controller 690 may control the head motor 660 to rotate the head 180.

The controller 690 may indicate the position of the detected user 1100 in the form of two-dimensional coordinates. The controller 690 may calculate the rotation angle of the head 180 using the coordinates corresponding to the position of the user 1100 and control the head motor 660 based on the calculated rotation angle.

In some examples, while the controller 690 controls the head motor 660, the user 1100 may move from an existing position to another position. The controller 690 may re-detect the position of the user 1100 using the sensing unit 630, after rotating the head 180 by the calculated rotation angle. The controller 690 may correct the rotation angle of the head 180 based on the re-detected position of the user 1100, such that the face detector 640 accurately faces the user 1100.

The robot 1 may detect the face of the user using the face detector 640 (S1010). The controller 690 may control the face detector 640 to acquire the image 11 including the face of the user 1100, after rotating the head 180 such that the face detector 640 faces the user 1100.

The robot 1 may detect the user's intention to interact with the robot 1 based on the line of sight of the user detected from the detected face (S1020). Referring to FIG. 11, the controller 690 may detect the eyes of the user 1100 using an image recognition algorithm from the image 11 acquired through the face detector 640. The controller 690 may detect a direction of the line of sight S1 of the user 1100 from the detected eyes of the user 1100. For example, the controller 690 may detect the direction of pupils using a known eye tracking algorithm, thereby detecting the direction of the line of sight S1 of the user 1100.

Upon detecting that the detected line of sight S1 faces the robot 1, the controller 690 may detect that the user 1100 has an intention to interact with the robot 1. For example, the controller 690 may detect presence of the interaction intention upon detecting that the line of sight S1 faces the operation unit 183, because the user 1100 having the intention to interact with the robot 1 generally views the operation unit 183 of the robot 1.

Furthermore, the line of sight of the user 1100 having the interaction intention may continuously face the robot 1 or the operation unit 183. In contrast, the line of sight of the user 1100 without the interaction intention may be changed to another direction after facing the robot 1 or the operation unit 183 during a minute time. Therefore, the controller 690 may detect the interaction intention when the line of sight S1 faces the robot 1 or the operation unit 183 during a predetermined time or more, thereby more improving detection accuracy.

Figure 12:
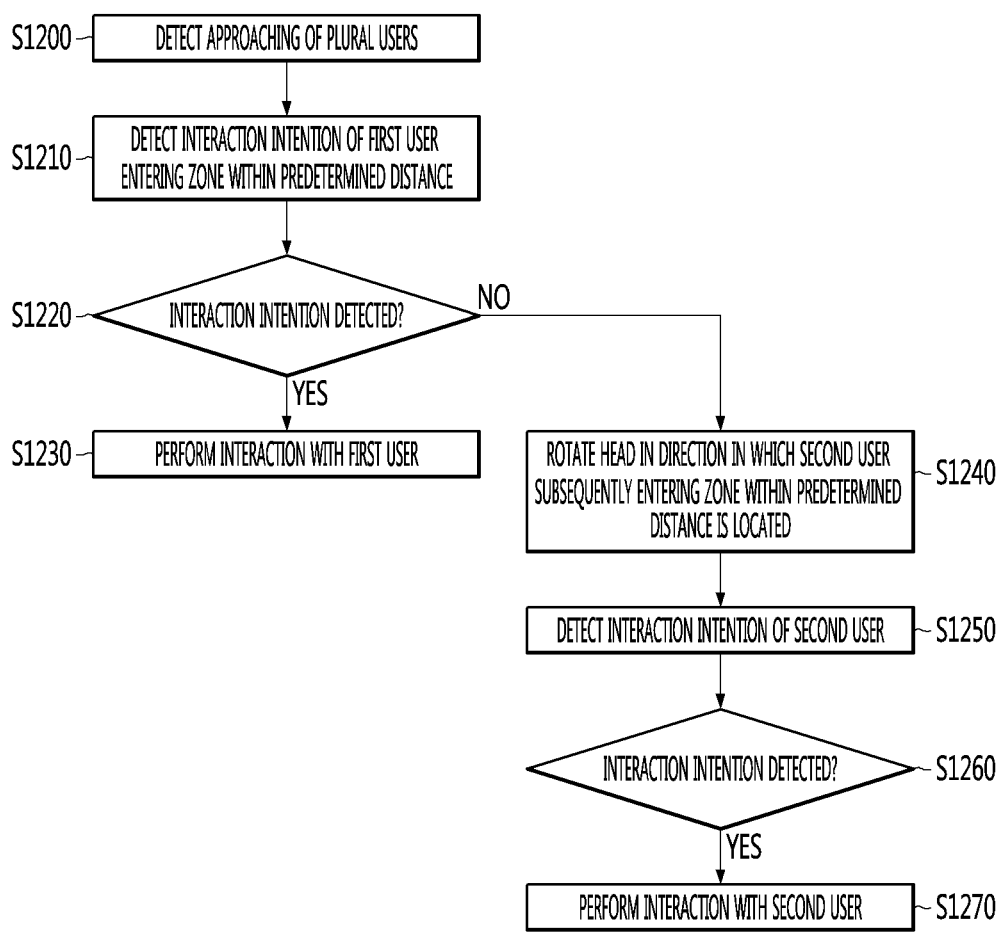
FIGS. 12 to 14 are views illustrating an example of operation of detecting a user having an interaction intent when a robot of the present disclosure detects the approaching of a plurality of users.
Figure 13:
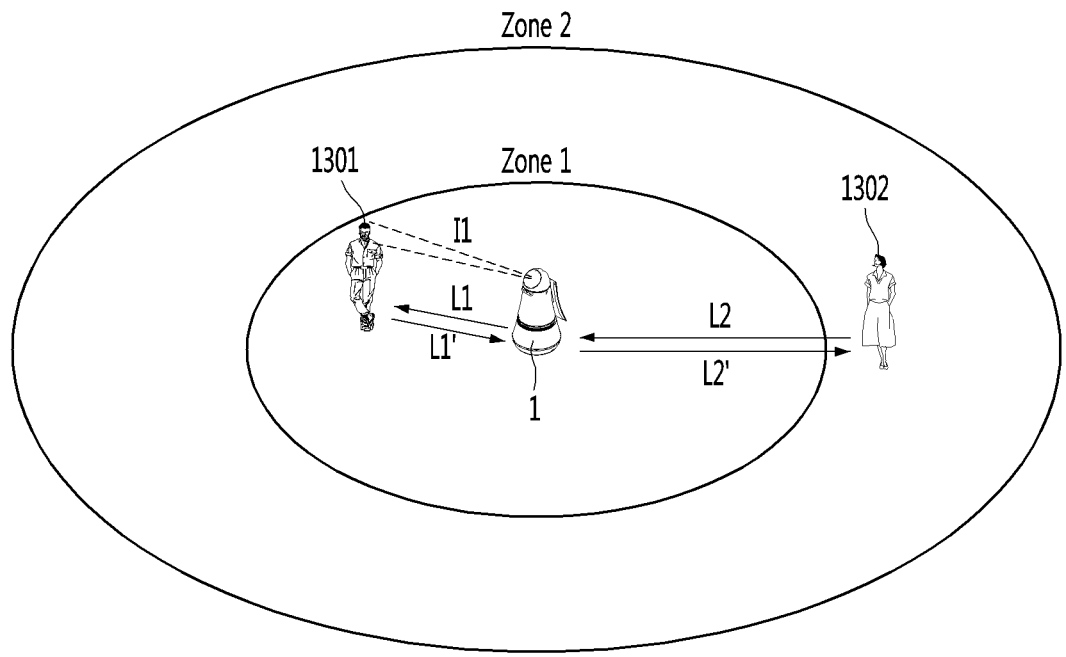
Figure 14:
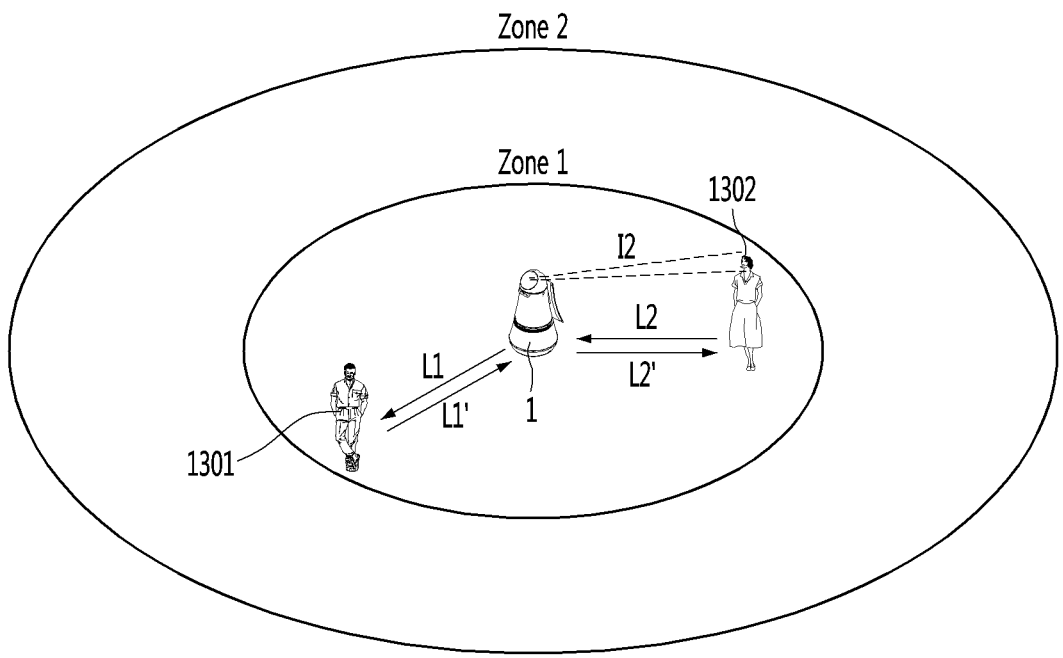

FIGS. 12 to 14 are views illustrating an example of operation of detecting a user having an interaction intention when a robot 1 of the present disclosure detects the approaching of multiple users. When there are many users in public places such as airports and department stores, a plurality of users may pass near the robot 1. The robot 1 according to the embodiment of the present disclosure may smoothly detect a user having an interaction intention even when approaching of the plurality of users is detected.

Referring to FIGS. 12 to 14, the robot 1 may detect approaching of the plurality of users (S1200). Hereinafter, in FIGS. 12 to 14, assume that the plurality of users includes a first user 1301 and a second user 1302, for convenience of description.

Similar to the description of FIGS. 8 to 9, the controller 690 may detect approaching of the first user 1301 and the second user 1302 present in a detection zone Zone 2 within a predetermined distance from the robot 1 using the sensors 632 and 634 included in the sensing unit 630. The detection zone Zone 2 may mean a zone having a maximum detection distance or less of the object detection sensor 632.

The robot 1 may detect the interaction intention of the first user who has entered an area within a predetermined distance among the plurality of detected users (S1210). The controller 690 may detect the interaction intention of the first user 1301, who has first entered the interaction intention detection zone Zone 1 in the detection zone 2, among the plurality of detected users 1301 and 1302. The interaction intention detection zone Zone 1 may be equal to the detection zone Zone 2 or a portion of the detection zone Zone 2.

Similar to the description of FIGS. 10 to 11, the controller 690 may rotate the head 180 such that the face detector 640 faces the first user 1301. The controller 690 may control the face detector 640 to acquire an image including the face of the first user 1301, and detect the direction of the line of sight of the first user 1301, thereby detecting the interaction intention. For example, when approaching of the plurality of users is detected, the robot 1 may prioritize the plurality of users according to the order of entry into the interaction intention detection zone Zone 1, thereby efficiently detecting the interaction intentions of the plurality of users.

In some embodiments, prioritization may be performed in various manners. For example, prioritization may be performed in the order of distances between the robot 1 and users. Alternatively, prioritization may be performed in the order of arrival to the robot 1 calculated based on the movement speed of the user.

If the interaction intention is detected (YES of S1220), the robot 1 may perform interaction with the first user 1301 (S1230). In this example, even if another user enters the interaction intention detection zone Zone 1, the controller 690 may continuously perform interaction with the first user 1301. When the first user 1301 leaves the interaction intention detection zone Zone 1 after interaction with the first user 1301, the controller 690 may detect the interaction intention of the other user to perform interaction.

In contrast, if the interaction intention is not detected (NO of S1220), the robot 1 may rotate the head 180 toward a second user who has subsequently entered the area within the predetermined distance among the plurality of users (S1240), and detect the interaction intention of the second user (S1250). When the interaction intention of the first user 1301 is not detected from the image 11 acquired through the face detector 640, the controller 690 may detect the interaction intention of the second user 1302, who has entered the interaction intention detection zone (Zone 1) subsequently to the first user 1301.

To this end, the controller 690 may rotate the head 180 such that the face detector 640 faces the second user 1302 and control the face detector 640 to acquire an image 12 including the face of the second user 1302. The controller 690 may detect the direction of the line of sight of the second user 1302 from the acquired image 12 and detect the interaction intention of the second user 1302 based on the detected direction of the line of sight.

If the interaction intention of the second user is detected (YES of S1260), the robot 1 may perform interaction with the second user (S1270). In contrast, if the interaction intention of the second user is not detected, the controller 690 may detect the interaction intention of another user who has entered the interaction intention detection zone (Zone 1).

In some embodiments, even if the interaction intention of the first user 1301 is not detected, the controller 690 may not perform interaction intention detection of another user until the first user 1301 leaves the interaction intention detection zone Zone 1. According to this embodiment, even if the controller 690 erroneously detects that the first user 1301 does not have an interaction intention, the first user 1301 may move to the robot 1 to perform interaction operation or voice utterance, thereby receiving a desired service from the robot 1.

Figure 15:
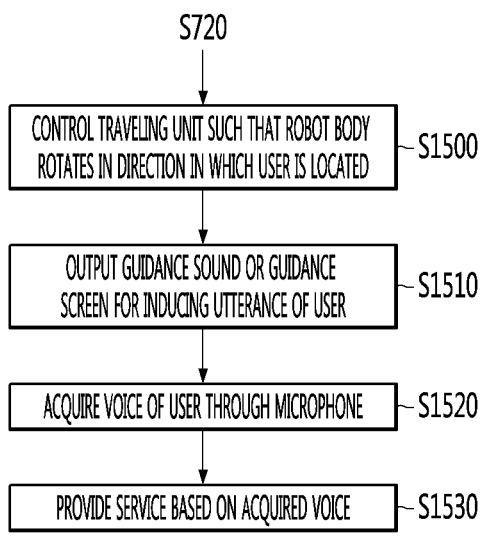
FIG. 15 is a flowchart illustrating a detailed example of performing interaction with a user having an interaction intent with a robot of the present disclosure.

FIG. 15 is a flowchart illustrating a detailed example of performing interaction with a user having an interaction intention at a robot 1 of the present disclosure. Referring to FIG. 15, when the interaction intention of the user is detected in step S720, the robot 1 may control the traveling unit 650 such that the robot body is rotated in the direction in which the user is located (S1500).

Rotation of the robot body in the direction in which the user is located may mean that the traveling direction is changed such that the front side of the robot 1 corresponds to the direction in which the user is located. For example, the controller 690 may control the motors (the first motor and the second motor) included in the traveling unit 650 such that the front side of the robot 1 corresponds to the direction in which the user is located.

The operation unit 183 of the head 180 may face the user upon detecting the interaction intention of the user. In this case, the controller 690 may control the head motor 660 in correspondence with control of the traveling unit 650 to rotate the head 180 relative to the body 100, in order to maintain the state in which the operation unit 183 faces the user, when the robot 1 rotates.

The robot 1 may output guidance sound or a guidance screen for inducing a user's utterance outputting verbal content (S1510). The controller 690 may output guidance sound for receiving, from the user, utterance related to a service desired to be received through the speaker 674 or a guidance screen through the touchscreen of the operation unit 183 of the display 672. In some embodiments, the controller 690 may output a menu screen through the touchscreen of the operation unit 183, in order to receive, from the user, input of selecting the service desired to be received.

The robot 1 may acquire voice according to user's utterance through the microphone of the input unit 620 (S1520), and provide a service based on the acquired voice to perform interaction with the user (S1530). The user may utter verbal content related to the service desired to be received from the robot 1 based on the output guidance sound or the guidance screen. For example, the voice may include a keyword for the service desired to be received by the user.

The controller 690 may receive the verbal content uttered by the user through the microphone of the input unit 620. The controller 690 may recognize the keyword included in the received voice using a known voice recognition method. The controller 690 may perform interaction with the user, by providing the service desired by the user based on the recognized keyword.

In some embodiments, the user may select a menu related to the service desired to be received from the robot 1 based on the menu screen output through the operation unit 183. The controller 690 may receive input of selection of the user through the touchscreen of the operation unit 183 and provide the service desired by the user based on the selected menu, thereby performing interaction with the user.

When input, such as verbal content, is not received from the user during a predetermined time, the controller 690 may output the guidance sound or the guidance screen again. Alternatively, when input such as verbal content is not received from the user during a predetermined time, the controller 690 may finish output of the guidance sound or the guidance screen and detect another user an interaction intention.

Figure 16:
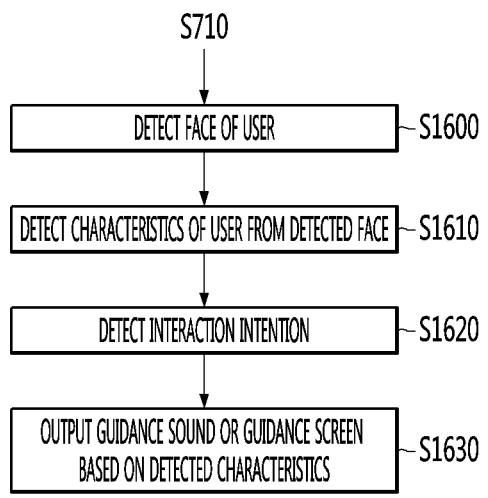
FIGS. 16 to 18 are views showing an example of operation of performing interactions based on characteristics of a user by a robot in embodiments of the present disclosure.
Figure 17:
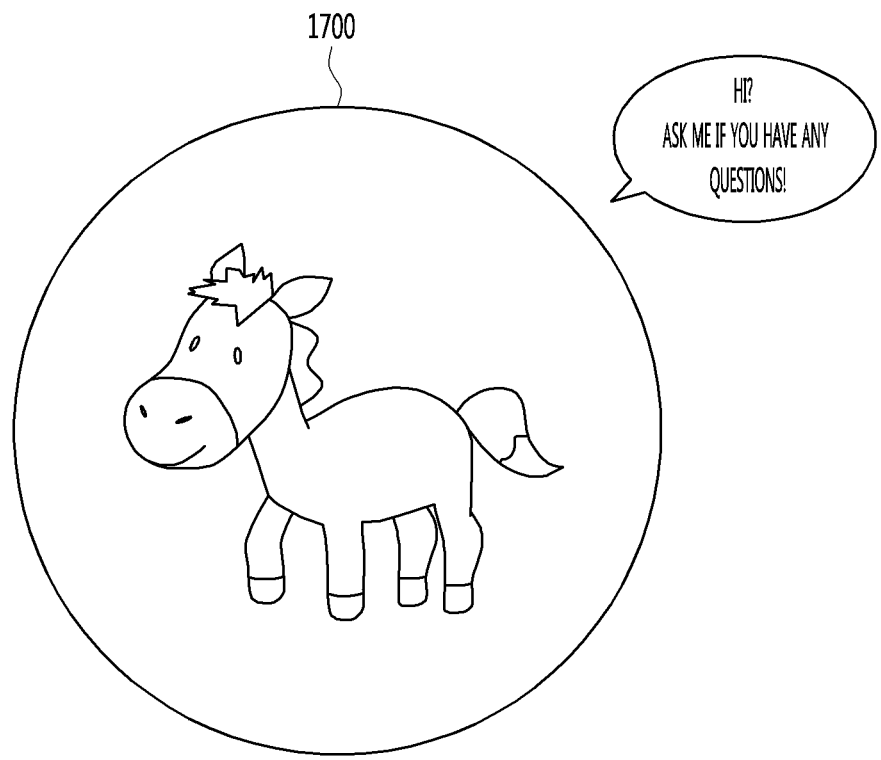
Figure 18:
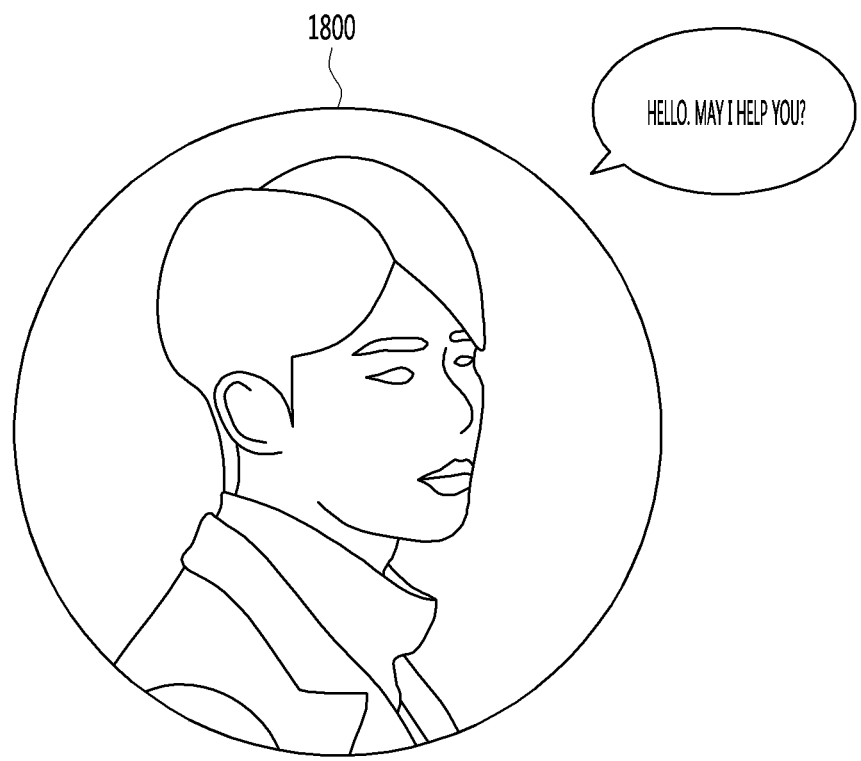

FIGS. 16 to 18 are views showing an example of operation of performing interaction based on characteristics of a user at a robot 1 of the present disclosure. Referring to FIG. 16, in step S710, the robot 1 may rotate the head 180 such that the face detector 640 faces the user.

The robot 1 may detect the face of the user using the face detector 640 (S1600). Step S1600 is similar to step S101 of FIG. 10 and thus a description thereof will be omitted.

The robot 1 may detect the characteristics of the user from the detected face (S1610). The controller 690 may extract features related to the characteristics of the user from the face of the user in the image acquired through the face detector 640. The controller 690 may detect the characteristics of the user based on the extracted features.

The features may include a variety of information related to the characteristics of the user, such as the size of the face or each part (eye, nose, mouth, etc.) of the face, the color skin, wrinkle, hairstyle, etc. The characteristics of the user may include characteristics capable of being recognized or estimated from the face of the user, such as age group, gender and race of the user.

The robot 1 may detect the interaction intention of the user (S1620) to determine whether the user wishes to interact with the robot, such as to require a service. If the interaction intention is detected, the robot 1 may output the guidance sound or the guidance screen based on the detected characteristics of the user (S1630).

Referring to the example of FIG. 17, if the characteristics of the user having the interaction intention is a "child", the controller 690 may display a guidance screen including an "animal character" through the touchscreen of the operation unit 183. In addition, the controller 690 may output the guidance sound by the voice of the "animal character".

Meanwhile, referring to the example of FIG. 18, if the characteristics of the user having the interaction intention is a "female youth", the controller 690 may display a guidance screen including a "male entertainer" or other character selected to be aesthetically pleasing the detected user through the touchscreen of the operation unit 183. In addition, the controller 690 may output the guidance sound by the voice of the "male entertainer".

Although not shown, for example, if the characteristics of the user is "European", the controller 690 may output the guidance sound in English, French, Spanish, etc. In contrast, if the characteristics of the user is "East Asian", the controller 690 may output the guidance sound in Korean, Chinese, Japanese, etc. For example, the robot 1 may provide the guidance screen or the guidance sound based on the characteristics of the user having the interaction intention, thereby more efficiently performing interaction with the user. In addition, by arousing user's interest in the robot 1, it is possible to enhance the positive image of the robot 1 and the manufacturer.

Figure 19:
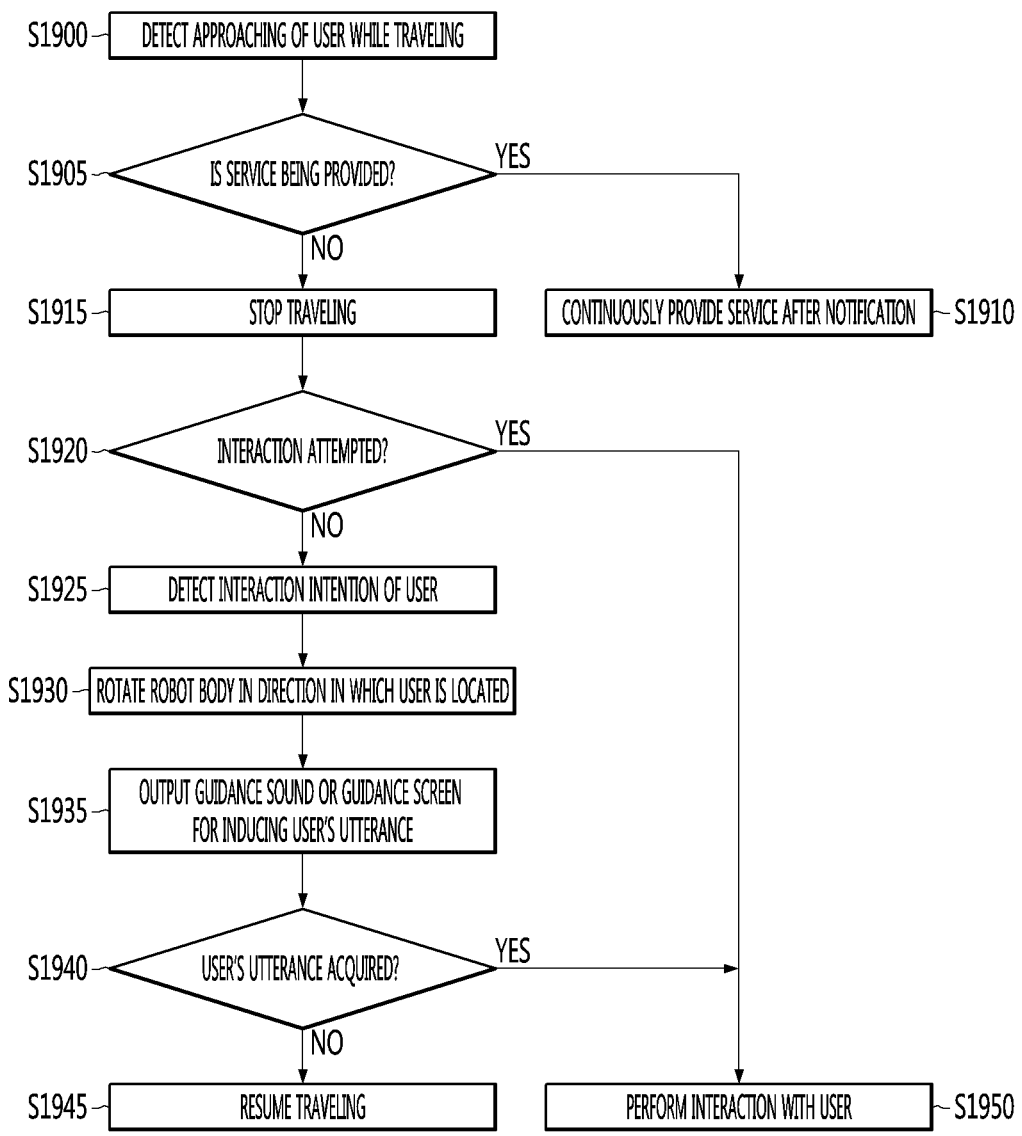
FIG. 19 is a flowchart illustrating another example of control operation performed by a robot in an embodiment of the present disclosure.

FIG. 19 is a flowchart illustrating another example of control operation performed by a robot 1 according to an embodiment of the present disclosure. Referring to FIG. 19, the robot 1 may detect approaching of the user during traveling (S1900). Step S1900 is similar to steps described in the above description of FIGS. 8 to 9, and thus, a detailed description thereof will be omitted.

When a service is provided to another user, the robot 1 may travels to a specific position based on the provided service. Alternatively, even if the robot 1 does not currently provides a service, the robot 1 may perform predetermined operation (advertisement screen display, etc.) while autonomously traveling in the space. When the robot 1 currently provides a service to another service or provides a predetermined service to a plurality of users (YES of S1905), the robot 1 may notify the approaching user that the service is currently being provided and then continuously provide the service (S1910).

The controller 690 may continuously drive the sensors included in the sensing unit 630 or the face detector 640 even while the service is provided to another user, in order to perform obstacle detection or position recognition while traveling. For example, the controller 690 may detect the user approaching the robot 1 through the sensing unit 630. However, the robot 1 may not be able to interact with the approaching user, because the robot is performing interaction with another user (e.g., the robot is already providing a service to the other user). The controller 690 may output a screen or sound indicating that interaction with the approaching user is not currently possible through the output unit 670 and continue to provide the service to the other user. In another example, the controller 690 may provide directions guiding the approaching user to another available robot 1 or direct communications unit 610 to transmit a signal to the other available robot 1 to travel toward the approaching user.

In contrast, when the robot 1 does not currently provide the service (NO of S1905), the robot 1 may stop traveling (S1915). When the approaching user is detected while the service is not being provided to another user, the controller 690 may control the traveling unit 650 to stop in order to more accurately detect the interaction intention of the user. In some embodiments, the controller 690 may control the head motor 660 such that the operation unit 183 of the head 180 faces the approaching user.

The robot 1 may determine whether input of attempting interaction is received from the user (S1920). If input of attempting interaction is not received (NO of S1920), the robot 1 may detect the interaction intention of the user (S1925). The controller 690 may determine whether input of attempting interaction is received from the user through the operation unit 183 or the input unit 620.

When the input is not received during a predetermined time, the controller 690 may detect the interaction intention of the user as described above with respect to steps S1000 to S1020 of FIG. 10. However, in some embodiments, step S1920 and step S1925 may be performed in parallel. For example, the controller 690 may detect the interaction intention of the user while waiting for reception of input of attempting interaction.

If the interaction intention is detected, the robot 1 rotates the robot body in the direction in which the user is located (S1930), and output the guidance sound or the guidance screen for inducing user's utterance (S1935). Step S1930 and step S1935 may be substantially correspond to step S1500 and step S1510 of FIG. 15.

If voice according to user's utterance is not acquired (NO of S1940), the robot 1 may determine that the user does not have an interaction intention and resume traveling (S1945). When input of voice is not acquired from the user during a predetermined time, the controller 690 may determine that the user does not have an interaction intention. In this situation, the controller 690 may control the traveling unit 650 to resume traveling. In some embodiments, when input of voice is not acquired from the user during a predetermined time, the controller 690 may output the guidance sound or the guidance screen predetermined number of times to verify that the user does not wish to receive a service.

In contrast, if verbal content according to the user's utterance is acquired (YES of S1940), the robot 1 may perform interaction with the user based on the acquired voice (S1950). When input related to attempting an interaction is received from the user in step S1920 (YES of S1920), the robot 1 may perform interaction with the user based on the received input (S1950). Thus, according to the embodiment shown in FIG. 19, the robot 1 can perform more intelligent operation depending on whether the service is being provided, when detecting that the user is approaching during traveling.

According to the embodiments of the present disclosure, it is possible to automatically detect the interaction intention of the user without receiving separate operation or a startup word from the user, thereby effectively performing interaction with the user. For example, since the robot uses various sensors such as a lidar sensor, a 3D stereo camera, a 2D camera and an RGBD sensor, it is possible to more accurately detect presence of a user and the interaction intention of the user. In addition, when approaching of a plurality of users is detected, the robot may perform prioritization according to the order of entry into a predetermined zone, thereby effectively detecting interaction intentions of the plurality of users.

When a user having an interaction intention is detected, the robot may control the traveling unit to face the user or to travel in the direction in which the user is located, such that the user easily recognize that the robot has detected the user. In addition, the robot may provide a screen or sound based on characteristics of the user having the interaction intention, thereby performing more effective interaction with the user. In addition, by arousing user's interest in the robot, it is possible to enhance the positive image of the robot and the manufacturer. In addition, since the lidar sensor for detecting the object is provided in the lower module of the robot, it is possible to easily detect a user having a low height, such as a child.

The foregoing description is merely illustrative of the technical idea of the present disclosure, and various changes and modifications may be made by those skilled in the art without departing from the essential characteristics of the present disclosure. Therefore, the embodiments disclosed in the present disclosure are intended to illustrate rather than limit the scope of the present disclosure, and the scope of the technical idea of the present disclosure is not limited by these embodiments. The scope of the present disclosure should be construed according to the following claims, and all technical ideas within the scope of equivalents should be construed as falling within the scope of the present disclosure.

An aspect of the present disclosure provides a robot capable of autonomously detecting a user who has an interaction intention without operation or utterance of a startup word of the user for interaction with the robot. Another aspect of the present disclosure provides a robot capable of efficiently detecting a user having an interaction intention from among users around the robot. Another aspect of the present disclosure provides a robot capable of efficiently detecting interaction intentions of a plurality of users when the plurality of users are located around the robot. Another aspect of the present disclosure provides a robot capable of notifying a user that the robot has detected a user having an interaction intention. Another aspect of the present disclosure, provides a robot capable of outputting audio or a screen in correspondence with characteristics of a user having an interaction intention. Another aspect of the present disclosure provides a robot capable of easily detecting a user having various heights.

A robot according to an embodiment of the present disclosure include a sensing unit configured to detect a user approaching to the robot and a face detector configured to detect an intention to interact with the robot from the face of the user, thereby automatically detecting the interaction intention of the user without operation or utterance of a startup word of the user. The sensing unit may include an object detection sensor configured to detect an object present in a detection zone within a predetermined distance from the robot and a user detection sensor configured to detect whether the object is a user. In some embodiments, the object detection sensor may be provided in a lower module of the robot, thereby efficiently detecting an object having a low height.

In some embodiments, when the robot detects a plurality of users, prioritization may be performed according to the order of entry into a predetermined zone to sequentially detect interaction intentions, thereby performing efficient interaction intention detection operation. The robot may detect characteristic of the user from the image including the face of the user acquired by the face detector and provide sound or a screen for inducing interaction based on the characteristics of the user.

In some embodiments, the face detector may be provided in a head of the robot, the robot may rotate the head based on the position of the user, and the face detector may acquire the image including the face of the user according to rotation of the head. The robot may detect a line of sight of the user from the image acquired by the face detector and detect presence of the interaction intention when the detected line of sight faces the head. In some embodiments, the robot may control a traveling unit to face the user or control the traveling unit to travel in a direction in which the user is located, when the interaction intention is detected.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A robot comprising:
a touch screen;
at least one sensor to detect a presence of a plurality of users;
a camera to acquire an image including a face of one of the users detected by the at least one sensor; and
a controller configured to:

prioritize a plurality of users according to an order of entry into a second detection zone from a first detection zone when the plurality of users are detected in the first detection zone, the first detection zone being within a first prescribed distance of the robot, and the second detection zone being within a second prescribed distance of the robot that is less than the first prescribed distance, detect a direction of a line of sight of a first user based on the image acquired by the camera when the first user has first entered the second detection zone from the first detection zone, determine that the first user has an intention to interact with the robot when the direction of the line of sight of the first user faces the touch screen, performing interaction with the first user when it is determined that the first user has an intention to interact with the robot, wherein performing interaction with the first user includes continuously perform interaction with the first user even when a second user has entered the second detection zone subsequently to the first user, manage at least one of a speaker or a display to output content to induce an interaction of the first user with the robot based on determining that the first user has the intention to interact with the robot, and detect, after performing interaction with the first user, an interaction intention of the second user with the robot when the first user leaves the second detection zone.

2. The robot of claim 1, wherein the at least one sensor includes:
an object detection sensor configured to detect an object present in the first detection zone; and
a detection sensor configured to detect whether the detected object is one of the plurality users.

3. The robot of claim 2, wherein the controller further:
detects the plurality of users present in the first detection zone through the at least one sensor,
controls the camera to acquire a first image including a face of the first user, and
determines whether the first user has an intention to interact with the robot based on the acquired first image.

4. The robot of claim 3, wherein the controller further:
manages the at least one of the speaker or the display to output content to induce the interaction of the first user with the robot when the first user has the intention to interact with the robot,
controls the camera to acquire a second image including a face of the second user, when the first user does not have the intention to interact with the robot, and
determines whether the second user has an intention to interact with the robot based on the acquired second image.

5. The robot of claim 2, wherein the object detection sensor includes a light detection and ranging (lidar) sensor and the user detection sensor includes a three-dimensional (3D) stereo camera.

6. The robot of claim 1, wherein the controller further:
determines that a user has the intention to interact with the robot when the direction of the line of sight of the user faces the touch screen during a prescribed time period.

7. The robot of claim 1, wherein the controller further:
detects one or more characteristics of a user from the image acquired by the camera, and manages the at least one of the speaker or the display to selectively output one of a plurality of contents based on the characteristics of the user.

8. The robot of claim 1, further comprising an input device configured to receive an input from a user,
wherein the controller further:
receives the input in response to the content outputted by the at least one of the speaker or the display through the input device, and
provides a service based on the received input to perform the interaction with the user.

9. The robot of claim 8,
wherein the input device includes a microphone, and
wherein the controller further:
receives vocal content uttered by a user through the microphone, and
recognizes a keyword included in the received vocal content and provides the service based on the recognized keyword.

10. The robot of claim 1, further comprising a wheel that rotates to move the robot based on a received driving force,
wherein the controller further:
detects an approach by a particular user through the at least one sensor while the robot is moving, and
controls one or more of the speaker or the display to output an indication that an interaction with between the particular user and the robot is not currently available when the robot is providing a service to another user.

11. The robot of claim 10, wherein the controller further:
controls the wheel to stop a traveling by the robot, when the service is not being provided to the other user,
determines whether the particular user has an intention to interact with the robot based on an image of the particular user acquired through the camera, and
controls the at least one of the speaker or the display to output content to induce the interaction of the particular user with the robot, when the controller determines that the particular user has the intention to interact with the robot.

12. A robot comprising:
a lower module including:
at least one wheel that rotates to move the robot based on receiving a driving force, and
a first sensor;
an upper module connected to an upper region of the lower module, the upper module including:
a case having a second sensor provided on one side thereof; and
a head connected to an upper region of the case and including a camera and a touch screen; and
a controller configured to:
detect an object present in a first detection zone within a prescribed first distance of the robot through the first sensor, and determine that the object is a user through the second sensor,
prioritize a plurality of users according to an order of entry into a second detection zone from the first detection zone when the plurality of users are detected in the first detection zone, the second detection zone being within a second prescribed distance of the robot that is less than the first prescribed distance,
acquire an image including a face of a first user through the camera when the first user has first entered the second detection zone from the first detection zone, detect a direction of a line of sight of the first user from the image acquired by the camera, determine that the first user has an intention to interact with the robot when the direction of the line of sight of the first user faces the touch screen, performing interaction with the first user when it is determined that the first user has an intention to interact with the robot, wherein performing interaction with the first user includes continuously perform interaction with the first user even if a second user has entered the second detection zone subsequently to the first user, manage an output module including at least one of a speaker or a display to output content to induce an interaction of the first user with the robot based on determining that the first user has the intention to interact with the robot, detect, after completing interaction with the first user, an interaction intention of the second user with the robot.

13. The robot of claim 12, wherein the head is rotatably coupled to the upper module, wherein the controller further:

detects a position of a user through at least one of the first sensor or the second sensor, and controls the head to rotate based on the detected position of the user such that the image captured by the camera includes the face of the user.

14. The robot of claim 12, wherein the controller further:

determines that a user has the intention to interact with the robot when the detected direction of the line of sight of the user faces the touch screen for at least a prescribed duration.

15. The robot of claim 12, wherein the controller manages the driving force to the at least one wheel such that the robot moves to face a user, based on determining that the user intends to interact with the robot.

16. The robot of claim 15, wherein the controller manages the driving force to the at least one wheel to cause the robot to travel in a direction, in which the user is located, based on determining that user intends to interact with the robot.

17. The robot of claim 12, wherein the first sensor includes a first light detection and ranging (lidar) sensor and a second lidar sensor configured to detect the object within the detection zone, and wherein a height of the first lidar sensor from a surface on which the robot is travelling is different from a height of the second lidar sensor from the surface on which the robot is travelling.

18. The robot of claim 17, wherein the second sensor includes a three-dimensional (3D) stereo camera configured to detect whether the object detected by the first sensor is a user.

19. The robot of claim 12, wherein the camera is provided on one side of the head.

20. The robot of claim 12, further comprising a microphone provided in the head, wherein the controller further:

receives vocal content uttered by a user through the microphone in response to the content outputted by the at least one of the speaker or the display of the output module, recognizes a keyword included in the received vocal content, and provides a service to the user based on the recognized keyword.

* * * * *